United States Patent
Ferrell et al.

(10) Patent No.: US 10,055,184 B1
(45) Date of Patent: Aug. 21, 2018

(54) SYSTEMS AND METHODS FOR PROVIDING CARD-BASED INTERFACES FOR ENUMERABLE DATASETS

(71) Applicant: Veritas US IP Holdings LLC, Mountain View, CA (US)

(72) Inventors: Timothy Ferrell, Oviedo, FL (US); Kirk Freiheit, Maitland, FL (US); Victor Leon Terry, II, Winter Springs, FL (US)

(73) Assignee: Veritas Technologies LLC, Mountain View, CA (US)

( * ) Notice: Subject to any disclaimer, the term of this patent is extended or adjusted under 35 U.S.C. 154(b) by 219 days.

(21) Appl. No.: 15/057,011

(22) Filed: Feb. 29, 2016

(51) Int. Cl.
| | |
|---|---|
| *G06F 3/0482* | (2013.01) |
| *G06F 3/14* | (2006.01) |
| *G06F 3/0484* | (2013.01) |
| *G06T 13/80* | (2011.01) |
| *G06F 17/24* | (2006.01) |
| *H04L 12/911* | (2013.01) |

(52) U.S. Cl.
CPC .............. *G06F 3/14* (2013.01); *G06F 3/0482* (2013.01); *G06F 3/04842* (2013.01); *G06F 3/04845* (2013.01); *G06F 17/241* (2013.01); *G06T 13/80* (2013.01); *H04L 47/82* (2013.01)

(58) Field of Classification Search
CPC ............... G06F 3/0482; G06F 3/04842; G06F 3/04845; G06F 17/241; G06T 13/80; H04L 47/82
See application file for complete search history.

(56) References Cited

U.S. PATENT DOCUMENTS

| | | | |
|---|---|---|---|
| 8,175,863 B1* | 5/2012 | Ostermeyer | ........ G06F 17/5009 703/13 |
| 8,245,156 B2 | 8/2012 | Mouilleseaux | |
| 2006/0282848 A1* | 12/2006 | Watanabe | ............ H04N 5/4403 725/37 |

(Continued)

OTHER PUBLICATIONS

Timothy Ferrell, et al; Display Screen With Animated Graphical User Interface; U.S. Appl. No. 29/554,905, filed Feb. 17, 2016.

(Continued)

*Primary Examiner* — Anil Bhargava
(74) *Attorney, Agent, or Firm* — FisherBroyles LLP

(57) ABSTRACT

A computer-implemented method for providing card-based interfaces for enumerable datasets may include (1) identifying computing resources within a computing environment subject to a unified administration, (2) identifying a request to display the computing resources within a graphical user interface, (3) portraying each computing resource within the graphical user interface as a card that includes (i) a button interface element on a front face of the card that, when invoked, presents a radial menu of actions to perform on the computing resource, (ii) a summary description of the computing resource on the front face of the card, (iii) a flipping interface element that, when invoked, flips the card between the front face of the card and a back face of the card, and (iv) a detailed description of the computing resource on the back face of the card. Various other methods, systems, and computer-readable media are also disclosed.

20 Claims, 21 Drawing Sheets

(56) References Cited

U.S. PATENT DOCUMENTS

| | | | | |
|---|---|---|---|---|
| 2012/0113147 A1* | 5/2012 | Virtanen | ............... | G06F 3/0482 345/650 |
| 2013/0166471 A1* | 6/2013 | Fukuda Kelley | . | G06F 17/30038 705/344 |
| 2014/0059496 A1* | 2/2014 | White | ................... | G06F 3/0488 715/841 |
| 2014/0337774 A1* | 11/2014 | Baarz | .................... | G06F 3/0486 715/769 |
| 2016/0216875 A1* | 7/2016 | Soo | ...................... | G06F 3/0482 |

OTHER PUBLICATIONS

Thomas, Jacqueline, "A Serious Look At Card Based Design", https://webdesignledger.com/card-based-design, as accessed Jan. 19, 2016, (Jun. 12, 2014).

"Use radial menus to display commands in OneNote for Windows 8", https://support.office.com/en-us/article/Use-radial-menus-to-display-commands-in-OneNote-for-Windows-8-0D75F03F-CDE7-493A-A8A0-B2ED6F99FBE2?ui=en-US&rs=en-US&ad=US, as accessed Jan. 19, 2016, Microsoft, (On or before Jan. 19, 2016).

"BioShock", https://www.2kgames.com/bioshock/, as accessed Jan. 19, 2016, 2K Games, (Oct. 5, 2006).

"PlanEscape: Torment", https://www.gog.com/game/planescape_torment, as accessed Jan. 19, 2016, GOG.com, (Aug. 9, 2013).

* cited by examiner

SYSTEMS AND METHODS FOR PROVIDING CARD-BASED INTERFACES FOR ENUMERABLE DATASETS

BACKGROUND

In the digital age, organizations may rely on increasingly complex information technology infrastructures to manage a variety of data, applications, and computing services. However, with the power and flexibility of these increasingly large and complex pools of computing resources may come the increasing difficulty of administrating said computing resources.

As an example, some organizations may deploy many virtual machines to handle and process data. Virtualization is a widely-used technology with many advantages. One physical machine can host many different virtual machines, allowing users access to several operating systems at once. Virtual machines can be effectively sandboxed, preventing errors from affecting the rest of the system. Virtual machines may also facilitate the efficient use of underlying physical resources and/or facilitate the efficient reconfiguration of computing resources with minimal disruption. In addition, virtual machines may quickly be provisioned, cloned, paused, or removed as needed. However, these same features may give rise to a dynamic computing environment that calls for additional attention from an administrator to monitor and make adjustments.

While administrators may be tasked with increasingly complex information infrastructures to manage, they may also find themselves "on call" with greater frequency. Accordingly, administrators may wish to perform tasks remotely, often from mobile devices. Unfortunately, traditional enterprise management interfaces may suffer from cumbersome designs with poor usability in the general case and particularly poor usability on mobile devices. These enterprise management interfaces may pose obstacles to quickly and easily apprehending the current state of a pool of computing resources, navigating the interface for specific information, and/or for acting on such information—especially on a mobile device that may lack traditional input devices (e.g., a physical keyboard and/or mouse) or that may have a relatively small screen.

Accordingly, the instant disclosure identifies and addresses a need for additional and improved systems and methods for providing card-based interfaces for enumerable datasets.

SUMMARY

As will be described in greater detail below, the instant disclosure generally relates to systems and methods for providing card-based interfaces for enumerable datasets by displaying representations of computing resources (e.g., virtual machines) as cards that provide a simple interface for viewing summarized information about the computing resources and performing actions on the computing resources. In some examples, these systems and methods may utilize animations to succinctly convey information (e.g., (1) a button-filling animation to demonstrate the progress of an action on the computing resource that may also implicate an altered and/or disabled functionality of the button and (2) a card-flipping animation to provide detailed information on the back of a card while visually enhancing the card metaphor). Additionally, in some examples these systems and methods may utilize radial menus to provide quick and intuitive access to administrative features applicable to a computing resource.

In one example, a computer-implemented method for providing card-based interfaces for enumerable datasets may include (1) identifying a group of computing resources within a computing environment subject to a unified administration, (2) identifying a request to display the computing resources within a graphical user interface, and (3) in response to the request, portraying each computing resource within the computing resources within the graphical user interface as a card that includes (i) a button interface element on a front face of the card that, when invoked, presents a radial menu of actions to perform on the computing resource, (ii) a summary description of the computing resource on the front face of the card, (iii) a flipping interface element that, when invoked, flips the card between the front face of the card and a back face of the card, and (iv) a detailed description of the computing resource on the back face of the card.

In one embodiment, the graphical user interface further may include a provisioning interface element that, when invoked, adds a new computing resource to the computing environment and adds a new card portraying the new computing resource to the graphical user interface.

In one embodiment, the new card portraying the new computing resource is added to the graphical user interface before the new computing resource is fully provisioned in the computing environment and the button interface element displays a filling animation while the new computing resource is being provisioned in the computing environment.

In one embodiment, the computer-implemented method may further include (1) receiving, via the radial menu, a selection of an action to perform on the computing resource, (2) initiating the action on the computing resource in response to receiving the selection of the action via the radial menu, and (3) displaying, via the button interface element, an animation indicating a progress toward completion of the action on the computing resource.

In some examples, portraying each computing resource within the plurality computing resources within the graphical user interface as a card is in response to determining that the graphical user interface may include an interface for a mobile device and/or a touchscreen device.

In some examples, portraying each computing resource within the computing resources within the graphical user interface as a card may include portraying the computing resources as a group of grid-aligned cards.

In one embodiment, the computing resources includes a group of virtual machines and portraying each computing resource within the computing resources within the graphical user interface as a card includes portraying each virtual machine within the virtual machines within the graphical user interface as a card.

In one embodiment, (1) the computing resources share a same computing resource type, (2) the summary description and the detailed description together include a group of fields common to the computing resource type, and (3) a layout of the fields on the card is uniform and based on the computing resource type.

In one embodiment, the detailed description of the computing resource portrays a larger number of data fields than the summary description of the computing resource portrays.

In one embodiment, the detailed description of the computing resource portrays more textual information than the summary description of the computing resource portrays.

In one embodiment, the detailed description of the computing resource portrays at least one detailed data field that specifically describes an aspect of the computing resource that is generally described by at least one summary data field.

In one embodiment, a system for implementing the above-described method may include (1) an identification module, stored in memory, that identifies a group of computing resources within a computing environment subject to a unified administration, (2) the identification module identifies a request to display the computing resources within a graphical user interface, (3) in response to the request, portraying each computing resource within the computing resources within the graphical user interface as a card that includes (i) a button interface element on a front face of the card that, when invoked, presents a radial menu of actions to perform on the computing resource, (ii) a summary description of the computing resource on the front face of the card, (iii) a flipping interface element that, when invoked, flips the card between the front face of the card and a back face of the card, and (iv) a detailed description of the computing resource on the back face of the card, and (4) at least one physical processor configured to execute the identification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to identify a group of computing resources within a computing environment subject to a unified administration and identify a request to display the computing resources within a graphical user interface.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
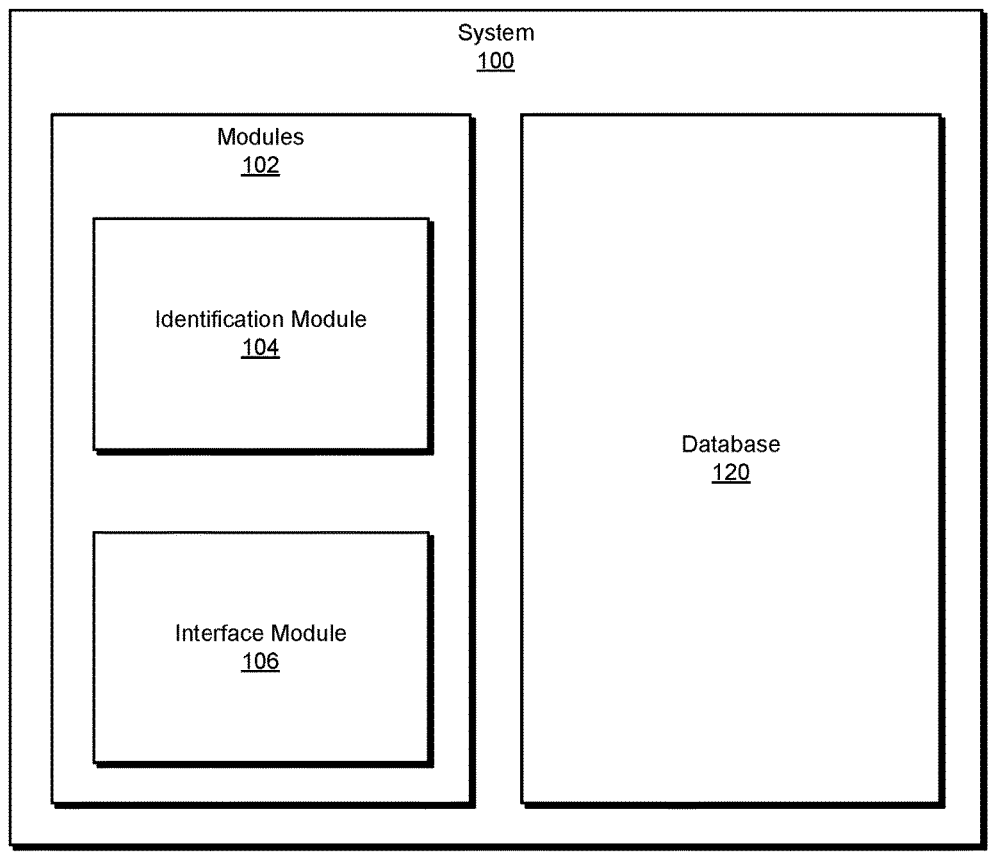
FIG. 1 is a block diagram of an exemplary system for providing card-based interfaces for enumerable datasets.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for providing card-based interfaces for enumerable datasets. As will be explained in greater detail below, by displaying representations of computing resources (e.g., virtual machines) as cards that provide a simple interface for viewing summarized information about the computing resources and performing actions on the computing resources, the systems and methods described herein may facilitate efficient and effective monitoring and configuration of computing resources from a variety of computing devices, including, e.g., mobile devices and touchscreen devices.

Figure 2:
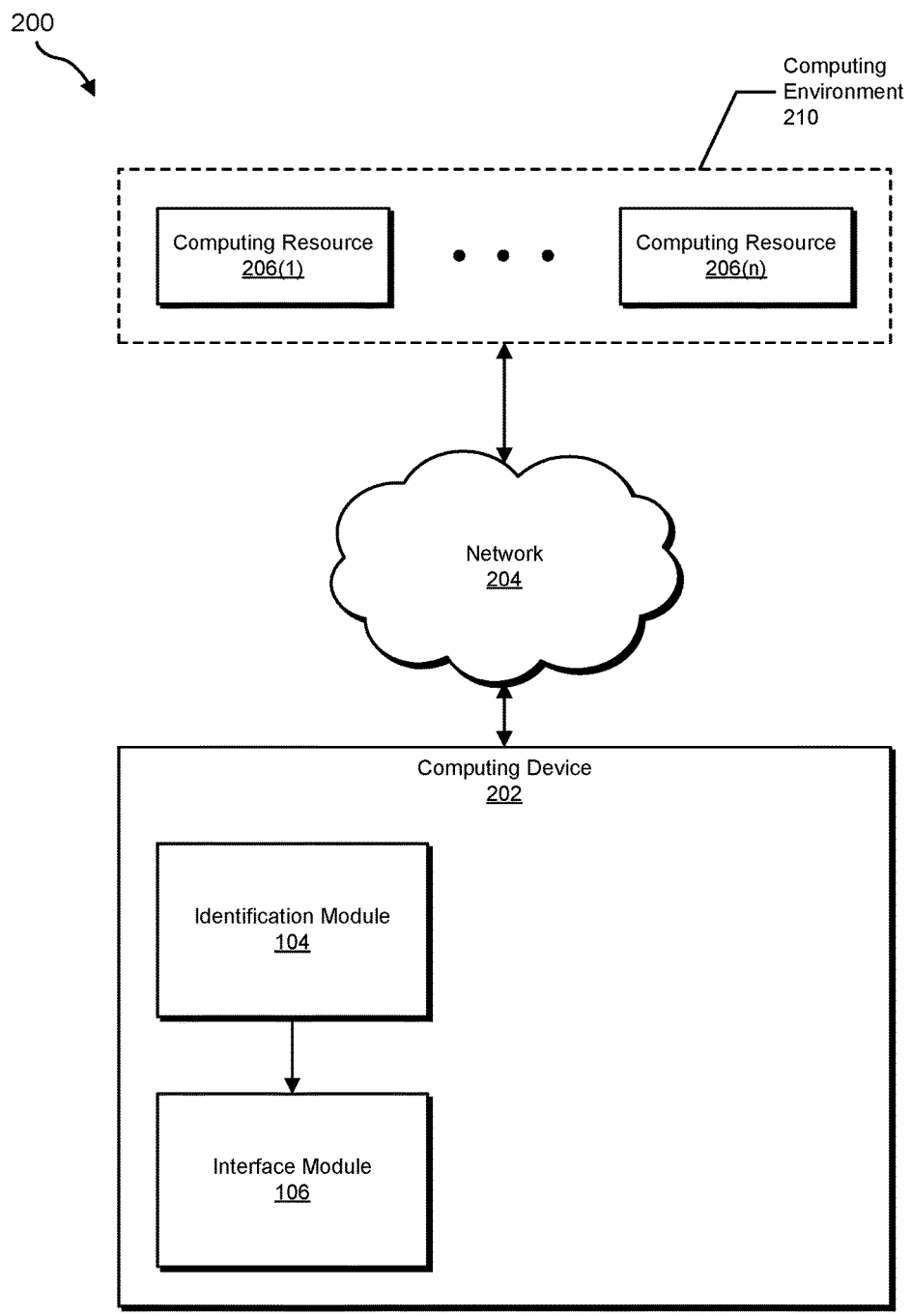
FIG. 2 is a block diagram of an additional exemplary system for providing card-based interfaces for enumerable datasets.

The following will provide, with reference to FIGS. 1-2, detailed descriptions of exemplary systems for providing card-based interfaces for enumerable datasets. Detailed descriptions of corresponding computer-implemented methods will also be provided in connection with FIG. 3. Detailed descriptions of card-based interfaces for enumerable datasets will be provided in connection with FIGS. 4-19. In addition, detailed descriptions of an exemplary computing system and network architecture capable of implementing one or more of the embodiments described herein will be provided in connection with FIGS. 20 and 21, respectively.

FIG. 1 is a block diagram of exemplary system 100 for providing card-based interfaces for enumerable datasets. As illustrated in this figure, exemplary system 100 may include one or more modules 102 for performing one or more tasks. For example, and as will be explained in greater detail below, exemplary system 100 may include an identification module 104 that identifies a plurality of computing resources within a computing environment subject to a unified administration. Identification module 104 may further identify a request to display the computing resources within a graphical user interface.

Exemplary system 100 may additionally include an interface module 106 that portrays, in response to the request, each computing resource within the plurality of computing resources within the graphical user interface as a card that includes (i) a button interface element on a front face of the card that, when invoked, presents a radial menu of actions to perform on the computing resource, (ii) a summary description of the computing resource on the front face of the card, (iii) a flipping interface element that, when invoked, flips the card between the front face of the card and a back face of the card, and (iv) a detailed description of the computing resource on the back face of the card. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or devices within computing environment 210), computing system 2010 in FIG. 20, and/or portions of exemplary network architecture 2100 in FIG. 21. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store an enumerable dataset. For example, database 120 may store information about a number of computing resources (e.g., virtual machines).

Database 120 may represent portions of a single database or computing device or a plurality of databases or computing devices. For example, database 120 may represent a portion of computing environment 210 in FIG. 2, computing system 2010 in FIG. 20, and/or portions of exemplary network architecture 2100 in FIG. 21. Alternatively, database 120 in FIG. 1 may represent one or more physically separate devices capable of being accessed by a computing device, such as devices within computing environment 210 in FIG. 2, computing system 2010 in FIG. 20, and/or portions of exemplary network architecture 2100 in FIG. 21.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing environment 210 via a network 204. In one example, computing device 202 may be programmed with one or more of modules 102 and/or may store all or a portion of the data in database 120. Additionally or alternatively, computing environment 210 may be programmed with one or more of modules 102 and/or may store all or a portion of the data in database 120.

In one embodiment, one or more of modules 102 from FIG. 1 may, when executed by at least one processor of computing device 202 and/or computing environment 210, enable computing device 202 and/or computing environment 210 to providing card-based interfaces for enumerable datasets. For example, and as will be described in greater detail below, one or more of modules 102 may cause computing device 202 and/or computing environment 210 to provide a graphical user interface 230 for administering computing resources 206(1)-(n) within computing environment 210. For example, and as will be described in greater detail below, identification module 104 may identify computing resources 206(1)-(n) within computing environment 210 subject to a unified administration. Identification module 104 may also identify a request to display computing resources 206(1)-(n) within graphical user interface 230. Interface module 106 may, in response to the request, portray computing resources 206(1)-(n) within graphical user interface 230 as cards 240(1)-(n), where each card (e.g., card 240(1) representing computing resource 206(1)) includes (i) a button interface element 242 on a front face 250 of the card (e.g., card 240(1)) that, when invoked, presents a radial menu 244 of actions 246 to perform on the computing resource (e.g., computing resource 206(1)), (ii) a summary description 252 of the computing resource on front face 250 of the card, (iii) a flipping interface element 248 that, when invoked, flips the card between front face 250 of the card and a back face 260 of the card, and (iv) a detailed description 262 of the computing resource on back face 260 of the card.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 2010 in FIG. 20, or any other suitable computing device.

Computing resources 206(1)-(n) generally represent any type or form of physical computing device, logical computing resource, data, application, service, and/or element of a computing infrastructure and/or environment. Examples of computing resources 206(1)-(n) include, without limitation, laptops, tablets, desktops, servers, cellular phones, Personal Digital Assistants (PDAs), storage systems, network paths, virtual machines, databases, data replicas, combinations of one or more of the same, exemplary computing system 2010 in FIG. 20, or any other suitable computing resource.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 2100 in FIG. 21, or the like. Network 204 may facilitate communication or data transfer using wireless or wired connections. In one embodiment, network 204 may facilitate communication between computing device 202 and computing environment 210.

Figure 3:
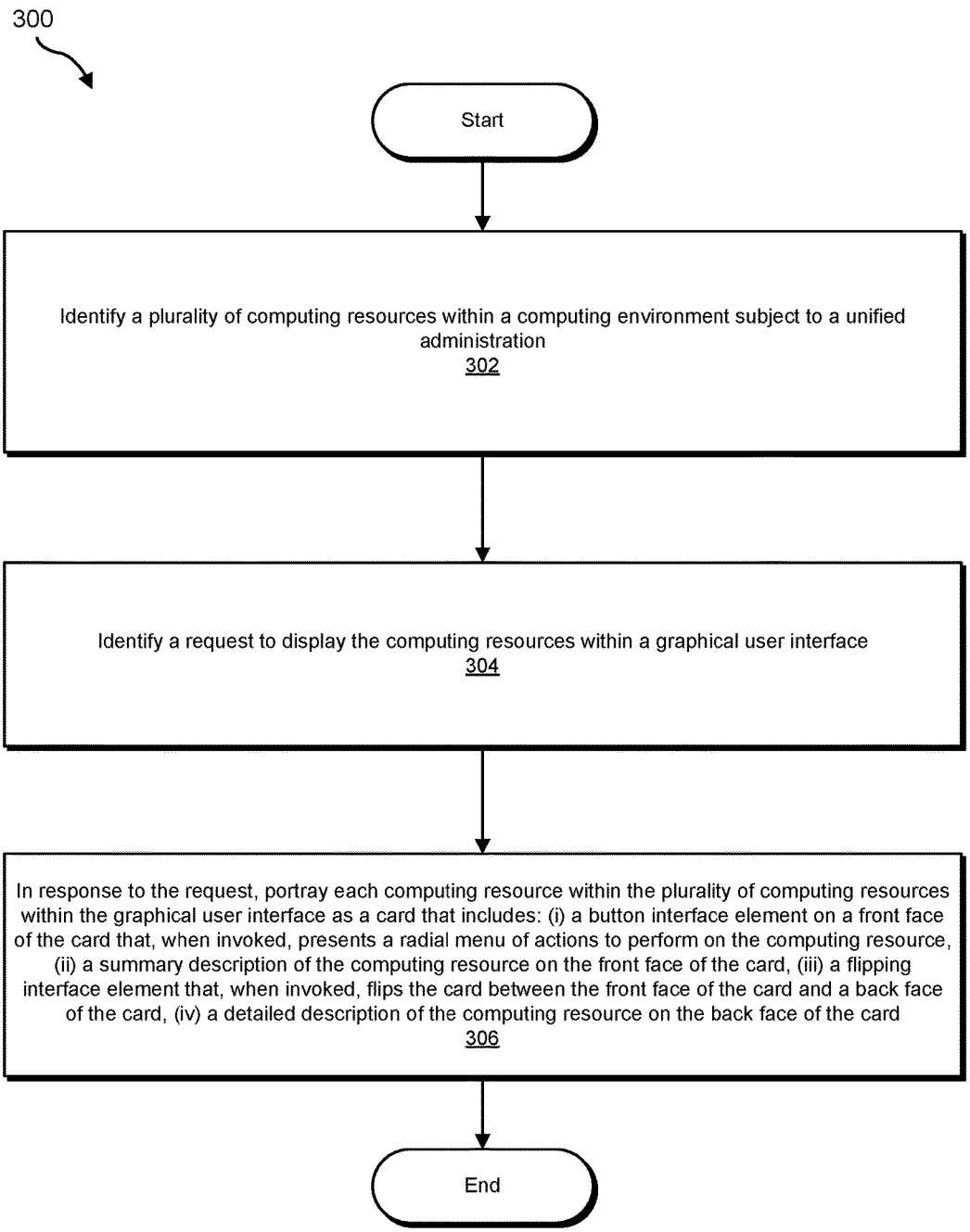
FIG. 3 is a flow diagram of an exemplary method for providing card-based interfaces for enumerable datasets.

FIG. 3 is a flow diagram of an exemplary computer-implemented method 300 for providing card-based interfaces for enumerable datasets. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 2010 in FIG. 20, and/or portions of exemplary network architecture 2100 in FIG. 21.

As illustrated in FIG. 3, at step 302, one or more of the systems described herein may identify a plurality of computing resources within a computing environment subject to a unified administration. For example, identification module 104 may, as part of computing device 202 in FIG. 2, identify computing resources 206(1)-(n) within computing environment 210 subject to a unified administration.

The term "computing resource," as used herein, may refer to any physical computing device and/or logical computing element supplied, managed, and/or stored by one or more computing devices. Examples of computing resources may include, without limitation, virtual machines, workloads, data replicas, databases, discrete storage resources, discrete processing resources, discrete networking resources, physical appliances, and/or application instances.

The term "computing environment," as used herein, may refer to any collection and/or system of computing subsystems. In some examples, term "computing environment" may refer to a collection and/or system of interoperating computing subsystems. Additionally or alternatively, the term "computing environment" may refer to a collection and/or system of jointly owned, managed, and/or administrated computing subsystems. Accordingly, in some examples the computing environment may be subject to a unified administration because, e.g., the computing resources within the computing environment may be jointly owned, managed, and/or administrated.

Identification module 104 may identify the plurality of computing resources within the computing environment in any of a variety of ways. For example, identification module 104 may identify an enumerable dataset that lists the plurality of computing resources. In some examples, the enumerable dataset may represent and/or be isomorphic to a database table (e.g., each item in the enumerable dataset corresponding to a table row). Additionally or alternatively, identification module 104 may scan the computing environment for the plurality of computing resources. In some examples, identification module 104 may query one or more subsystems within the computing environment and/or configured to manage a portion of the computing environment for a list of the plurality of computing resources. For example, identification module 104 may identify a list of virtual machines configured to execute within a computing environment (e.g., by querying one or more virtual machine managers and/or hypervisors, by consulting a database that tracks the virtual machines, and/or by scanning the computing environment for the virtual machines).

Identification module 104 may identify the plurality of computing resources in any of a variety of contexts. For example, identification module 104 may operate as a part of a computing administration system on an endpoint device and retrieve information about the plurality of computing resources from the computing resources for use at the endpoint device. Additionally or alternatively, identification module 104 may operate as a part of the computing environment (and, e.g., communicate information about the plurality of computing resources to an endpoint device, such as a mobile device operating outside the computing environment and/or outside any local and/or private network encompassing and/or encompassed by the computing environment).

Returning to FIG. 3, at step 304, one or more of the systems described herein may identify a request to display the computing resources within a graphical user interface. For example, identification module 104 may, as part of computing device 202 in FIG. 2, identify a request to display computing resources 206(1)-(n) within graphical user interface 230.

The term "graphical user interface," as used herein, may refer to any interface providing visual elements that may allow a user to interact with a computing system. In some examples, the graphical user interface may include an interface for an administration server and/or for a client that communicates with an administration server.

Identification module 104 may identify the request in any of a variety of contexts. For example, identification module 104 may identify the request by receiving a communication from and/or within the graphical user interface that the plurality of computing resources have been selected for display. For example, identification module 104 may receive a communication indicating a selection of a class of computing resources to display (e.g., a type of computing resource, such as virtual machines or databases, and/or a predefined group of computing resources). Additionally or alternatively, identification module 104 may identify the request by determining that an application configured to display the plurality of computing resources has been executed.

The graphical user interface may include any of a variety of interface elements for viewing representations of, altering representations of, and/or interacting with the plurality of computing resources. For example, as will be explained in greater detail below, the graphical user interface may include cards, each card representing a computing resource. In addition, in some examples, the graphical user interface may include a sorting interface element for sorting the cards (e.g., determining an order in which the cards are arranged in a grid) and/or a provisioning interface element for provisioning a new computing resource for inclusion in the plurality of computing resources.

Figure 4:
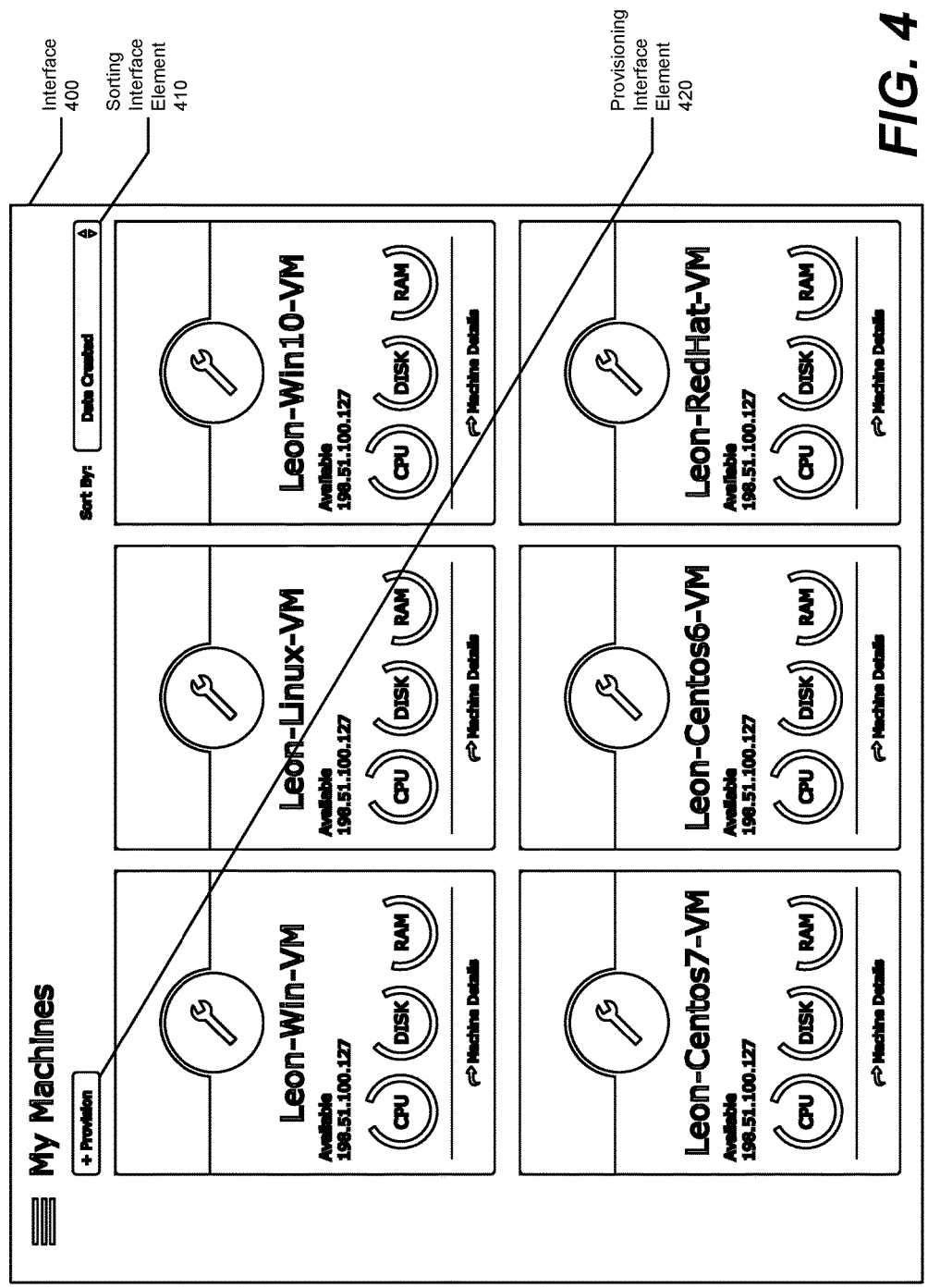
FIG. 4 is an illustration an exemplary card-based interface for enumerable datasets.

FIG. 4 illustrates an exemplary interface 400. As shown in FIG. 4, interface 400 may display a grid of cards (to be described in greater detail below). In addition, interface 400 may include a sorting interface element 410 and a provisioning interface element 420.

Returning to FIG. 4, at step 306, one or more of the systems described herein may portray, in response to the request, each computing resource within the plurality of computing resources within the graphical user interface as a card that may include (i) a button interface element on a front face of the card that, when invoked, presents a radial menu of actions to perform on the computing resource, (ii) a summary description of the computing resource on the front face of the card, (iii) a flipping interface element that, when invoked, flips the card between the front face of the card and a back face of the card, and (iv) a detailed description of the computing resource on the back face of the card. Although illustrated as separate elements, one or more of modules 102 in FIG. 1 may represent portions of a single module or application. For example, interface module 106 may, as part of computing device 202 in FIG. 2, in response to the request, portray computing resources 206(1)-(n) within graphical user interface 230 as cards 240(1)-(n), where each card (e.g., card 240(1) representing computing resource 206(1)) includes (i) button interface element 242 on front face 250 of the card (e.g., card 240(1)) that, when invoked, presents radial menu 244 of actions 246 to perform on the computing resource (e.g., computing resource 206(1)), (ii) summary description 252 of the computing resource on front face 250 of the card, (iii) flipping interface element 248 that, when invoked, flips the card between front face 250 of the card and a back face 260 of the card, and (iv) detailed description 262 of the computing resource on back face 260 of the card.

The term "card," as used herein, generally refers to a graphical interface element that provides a visual representation of an item as a card metaphor. For example, the term "card" may refer to self-contained, bounded (and, in some examples, substantially rectangular) visual element with information about an item within the bounds of the element. In addition, in some examples, a card may be portrayed as a flat, two-sided object (e.g., displaying different information on each side of the card). In some examples, each side of a card may have a consistent and/or predictable layout (e.g., thereby approximating a physical card with an unchanging layout of visual elements). In some examples, as will be explained in greater detail below, the card metaphor may be enhanced by an animation depicting a rotation of the card when switching between views of the two sides of a card.

The term "front face," as used herein, may generally refer to an initial view of a card, corresponding to one side of a two-sided card. Likewise, the term "back face" may generally refer to an alternative view of the card, corresponding to the other side of a two-sided card.

The term "interface element," as used herein, may refer to any element which may display a discrete set of information within an interface and/or which may trigger an action within an interface. Examples of interface elements may include buttons, pull-down menus, radial menus, cards, card faces, etc.

The term "button," as used herein, generally refers to an interface element that receives input in the form of a selection of the button (e.g., by clicking on and/or touching the button). In some examples, as will be explained in greater detail below, a button may be temporarily disabled, may change functionality reflecting a shift in state of an interface element within which the button is embedded, and/or may change visual appearance reflecting such a shifting state. In some examples, the visual representation of a button may consume a minimum area of a display device and/or may consume a minimum proportion of an area within an interface element in which the button is embedded.

The term "radial menu," as used herein, generally refers to any menu whose selectable elements are arranged along a circular form. In some examples, the term "radial menu" may refer to a context menu (e.g., a menu that appears upon an interaction—e.g., pressing the button on a card—and/or a menu that offers selections that are relevant based on an underlying state of a computing resource). In some examples, the radial menu may be activated by the button on a card and may encircle the button on the card when activated.

The term "summary description," as used herein, generally refers to any representation of information about a computing resource. In some examples, the summary description may include information about the computing resource that is prioritized for display (e.g., information prioritized for initial inspection and/or information shown by default). The term "detailed description," as used herein, generally refers to any representation of information about a computing resource. In some examples, the detailed description may include information about the computing resource that is less prioritized for display than the summary description (e.g., information not shown by default). In some examples, the detailed description may provide more detailed information than the summary description. In one example, the detailed description of the computing resource may portray a larger number of data fields describing the computing resource than the summary description of the computing resource portrays. In one example, the detailed description of the computing resource may portray more textual information than the summary description of the computing resource portrays (e.g., whereas the summary description may, in proportion, portray more non-textual information than the detailed description). In one example, the detailed description of the computing resource may portray at least one detailed data field that specifically describes an aspect of the computing resource that is generally described by at least one summary data field. For example, a summary data field may provide a characteristic of the computing resource whereas the detailed data field may provide a sub-characteristic of the computing resource that falls within the characteristic. Additionally or alternatively, the detailed data field may a precise value of a characteristic of the computing resource whereas the summary data field may provide a relatively approximate value of the characteristic and/or a representation of the value of the characteristic that provides a visual estimate that is quickly apprehensible but less precise.

Interface module 106 may portray the computing resources within the graphical user interface as cards in any of a variety of contexts. For example, interface module 106 may portray each computing resource within the plurality computing resources within the graphical user interface as a card in response to determining that the graphical user interface is an interface for a mobile device. By selecting a card-based interface when in a mobile display, the systems described herein may facilitate the efficient and effective administration of computing resources on small screens (e.g., by presenting large, clear, discrete, and/or easily selectable interface elements to represent computing resources). In some examples, interface module 106 may portray the computing resources as cards in response to determining that the graphical user interface is an interface for a touchscreen device. By selecting a card-based interface with radial menus when in a touchscreen display, the systems described herein may facilitate the efficient and effective administration of computing resources on touchscreens (e.g., by presenting simple interfaces with (1) few interactive interface elements (a) with sizes above specified thresholds and/or (b) with spacing above specified thresholds). In some examples, interface module 106 may provide the graphical user interface described herein as a uniform interface (e.g., as an interface that accepts input from a pointer device on a desktop or laptop as well as an interface that accepts input from touchscreens on desktops, laptops, and/or mobile devices).

Interface module 106 may portray the computing resources within the graphical user interface in any of a variety of ways. In some examples, interface module 106 may render interface elements in HTML ("HyperText Markup Language") and/or using CSS ("Cascading Style Sheets"). In some examples, interface module 106 may dynamically create cards (e.g., rendered in HTML and/or CSS) with a scripting language such as JavaScript based on an enumerable dataset. Additionally or alternatively, interface module 106 may render one or more visual effects and/or elements of the graphical user interface (e.g., button animations) using JavaScript.

In some examples, interface module 106 may portray each computing resource within the plurality of computing resources within the graphical user interface as a card by portraying the plurality of computing resources as a plurality of grid-aligned cards. By portraying computing resources as grid-aligned cards, interface module 106 may efficiently portray multiple computing resources in a single screen, facilitate efficient browsing through computing resources, and/or provide adequate separation of input elements in the graphical user interface.

In one examples, (1) the computing resources may share a same computing resource type, (2) the summary description and the detailed description may include fields common to the computing resource type, and (3) a layout of the plurality of fields on the card may be uniform and based on the computing resource type. Examples of computing resource types may include, without limitation, virtual machines, databases, and backups. Where the computing resources share the same computing resource type, a card representing the resource type may display information pertaining to the resource type (e.g., based on data fields that describe the resource type). Furthermore, cards representing instances of the resource type may display the information according to a uniform layout that is based on the computing resource type. For example, a card representing a virtual machine may include an action button (e.g., that invokes a radial menu with actions pertinent to virtual machines to perform on the virtual machine), a name of the virtual machine, a status of the virtual machine (e.g., available, offline, provisioning, etc.), an IP address assigned to the virtual machine, information regarding processing, storage, and/or memory resources consumed by and/or available to the virtual machine, a guest operating system running within the virtual machine, etc.

In one example, the computing resources may be virtual machines. Accordingly, portraying each computing resource may entail portraying each virtual machine and portraying each computing resource within the plurality of computing resources within the graphical user interface as a card comprises portraying each virtual machine within the graphical user interface as a card.

FIG. 4 illustrates an exemplary card 500. As shown in FIG. 4, card 500 may include a button 520, a flip button 530, a front face 540, and summary information 550. Front face 540 may include button 520, flip button 530, and summary information 550. Flip button 530 may reverse card 500 to display a back face (e.g., with different information and/or interface elements).

As may be appreciated, the button on the card may be centrally placed (e.g., horizontally) on the card. In some examples, the front face of the card may include only two interactive interface elements (the button to bring up a radial menu of actions and a flip button to reverse the card), thereby simplifying the interface and reducing the error of an unintended input on a small device and/or a touchscreen device. In some examples, interface module 106 may present the button with a predetermined minimum size (e.g., to reduce the difficulty of selecting the button on a small device and/or a touchscreen device). In some examples, the button may consume a minimum proportion of a card. For example, the button may consume at least four percent of the area of the card. In some examples, the button may be circular. The foregoing considerations may improve the usability of the interface on a mobile and/or touchscreen device.

In one example, the new card portraying the new computing resource may be added to the graphical user interface before the new computing resource is fully provisioned in the computing environment and the button interface element displays a filling animation while the new computing resource is being provisioned in the computing environment. In this example, the button interface element may display a filling animation while the new computing resource is being provisioned in the computing environment. In some examples, the operation of the button during the filling animation may be disabled. Additionally or alternatively, the operation of the button during the filling animation may be to pause or to cancel the provisioning operation.

FIGS. 6-9 depict exemplary interface 400 during a filling animation. For example, provisioning interface element 420 (depicted in FIG. 4) may have been selected to provision a new computing resource (e.g., represented by card 500 in FIG. 5). Accordingly, the button of the new card (e.g., button 520 of card 500) may present an animation of the button filling (e.g., from the button up). In some examples, the speed of the animation may be based on time estimates based on historical data (e.g., so that the animation completes at the time that the provisioning operation is estimated to complete). Additionally or alternatively, the button may fill to predetermined levels as predetermined checkpoints in the progress of the provisioning operation are met.

FIGS. 10-16 depict exemplary interface 400 during a card flipping animation. For example, flip button 530 (depicted in FIG. 5) may have been selected to flip card 500 to show the back face of card 500. The visual transition provided by the flipping animation may enhance the card metaphor provided by the graphical user interface, thereby potentially increasing the ease of navigation for information.

Figure 5:
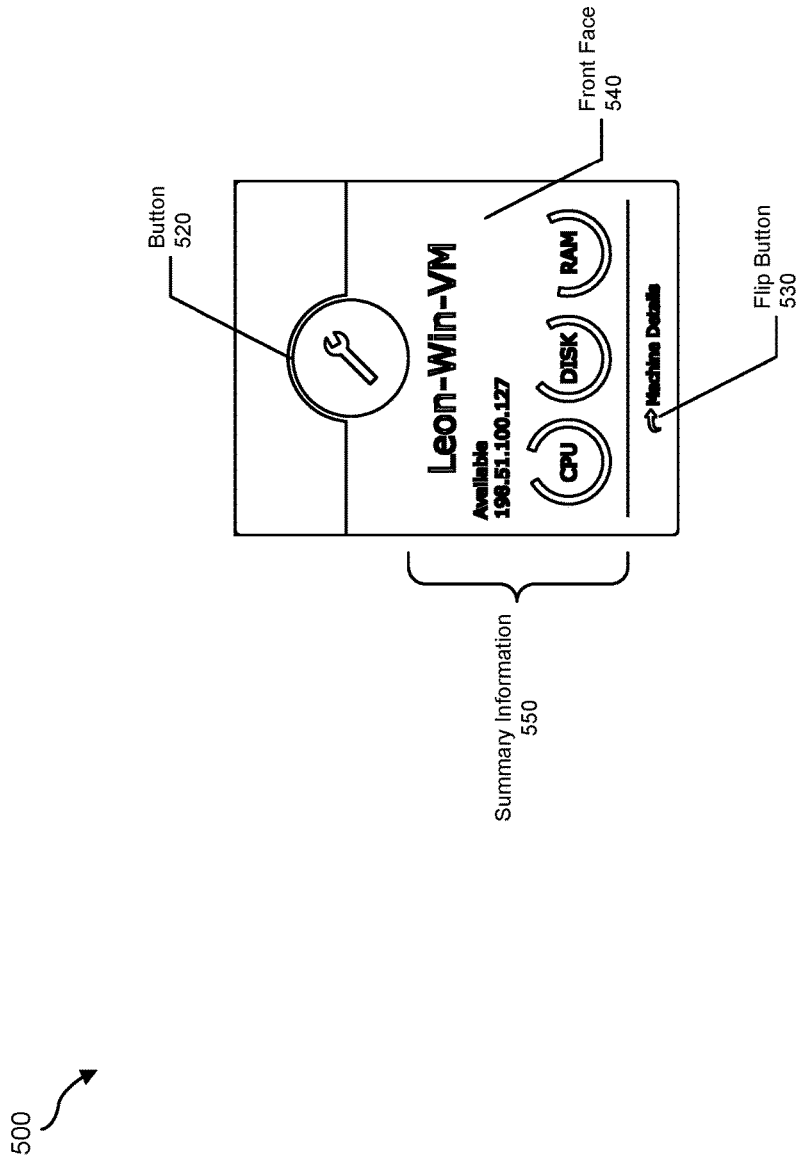
FIG. 5 is an illustration an exemplary card-based interface for enumerable datasets.
Figure 6:
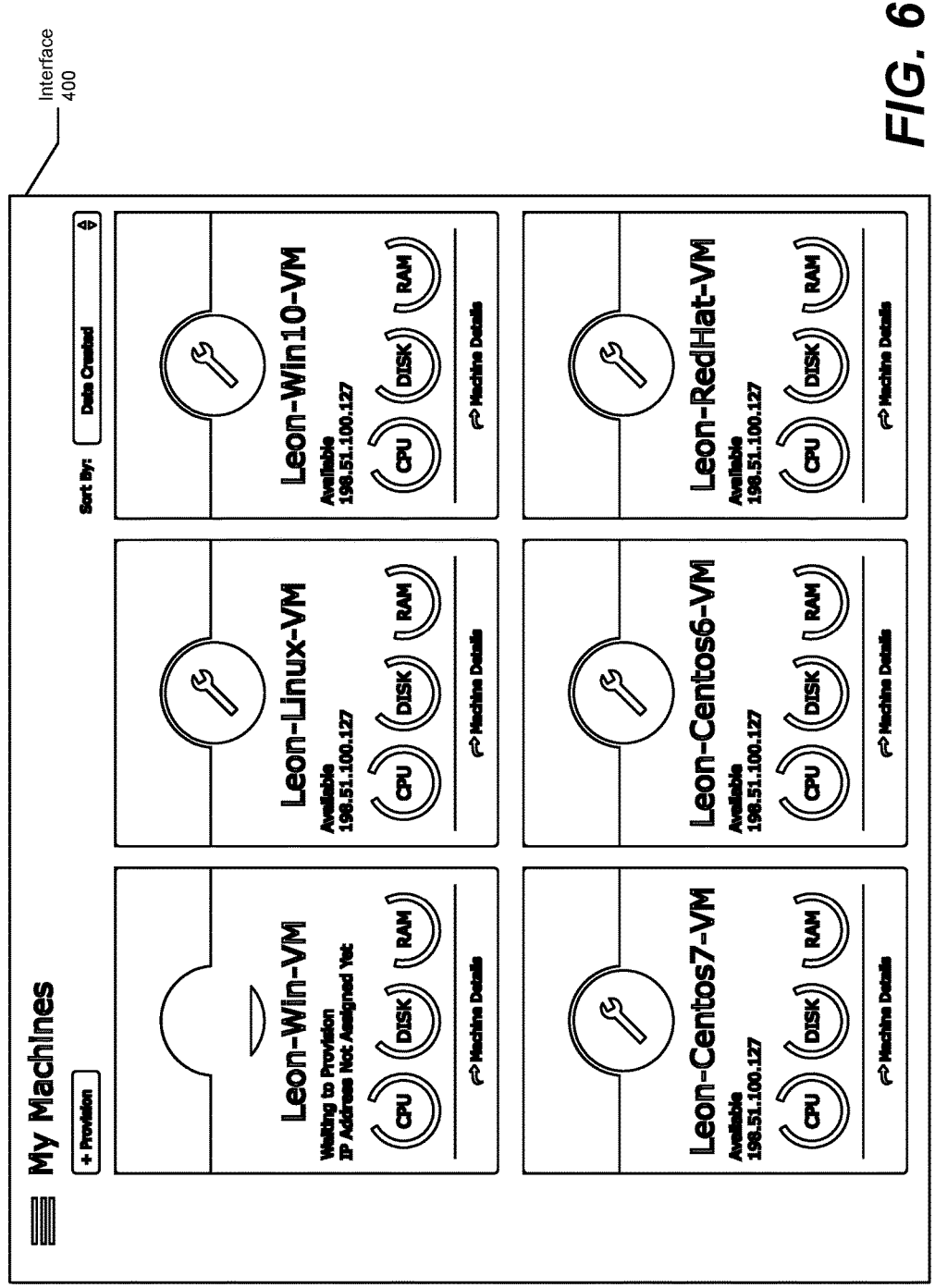
FIG. 6 is an illustration an exemplary card-based interface for enumerable datasets.
Figure 7:
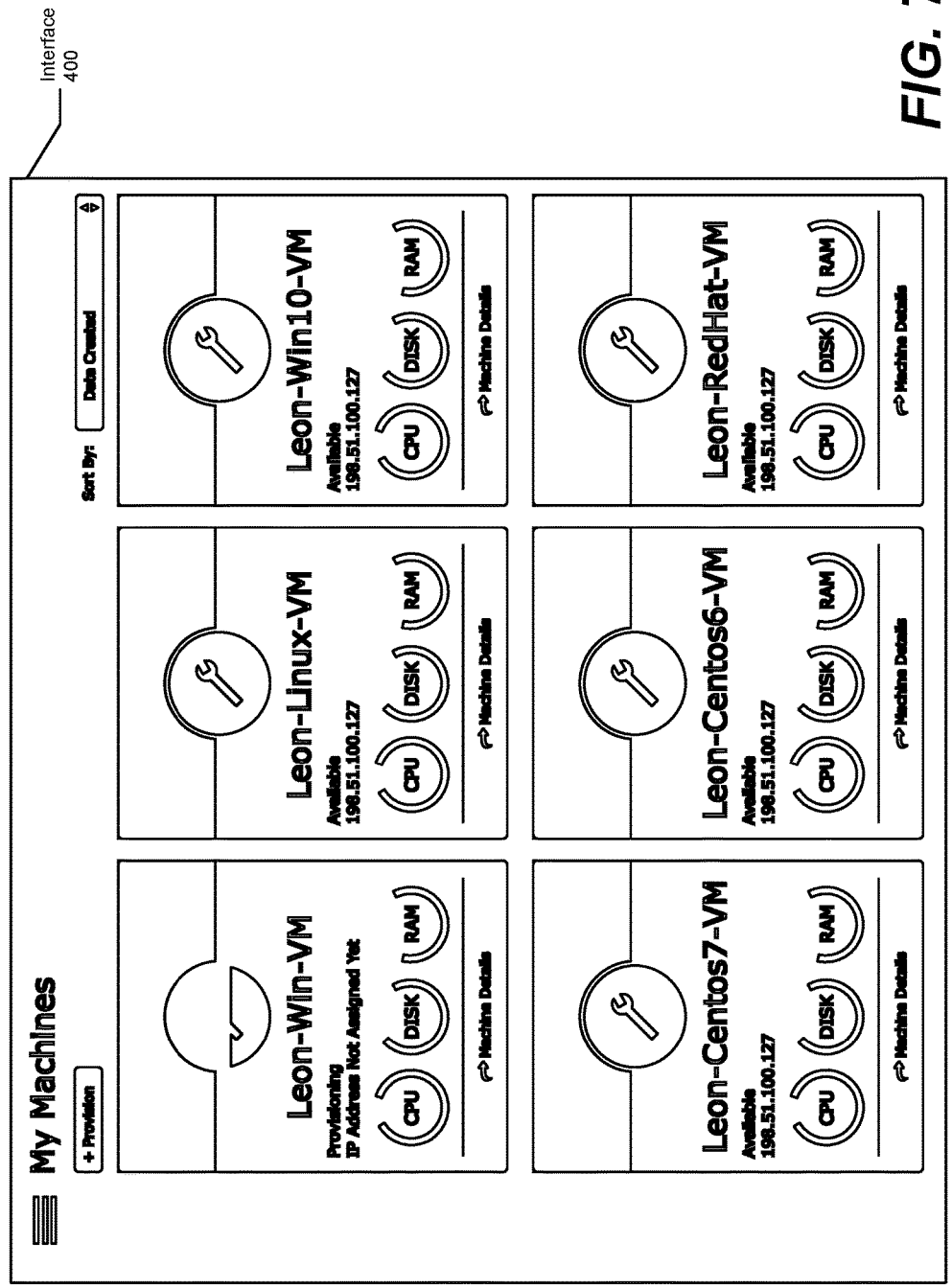
FIG. 7 is an illustration an exemplary card-based interface for enumerable datasets.
Figure 8:
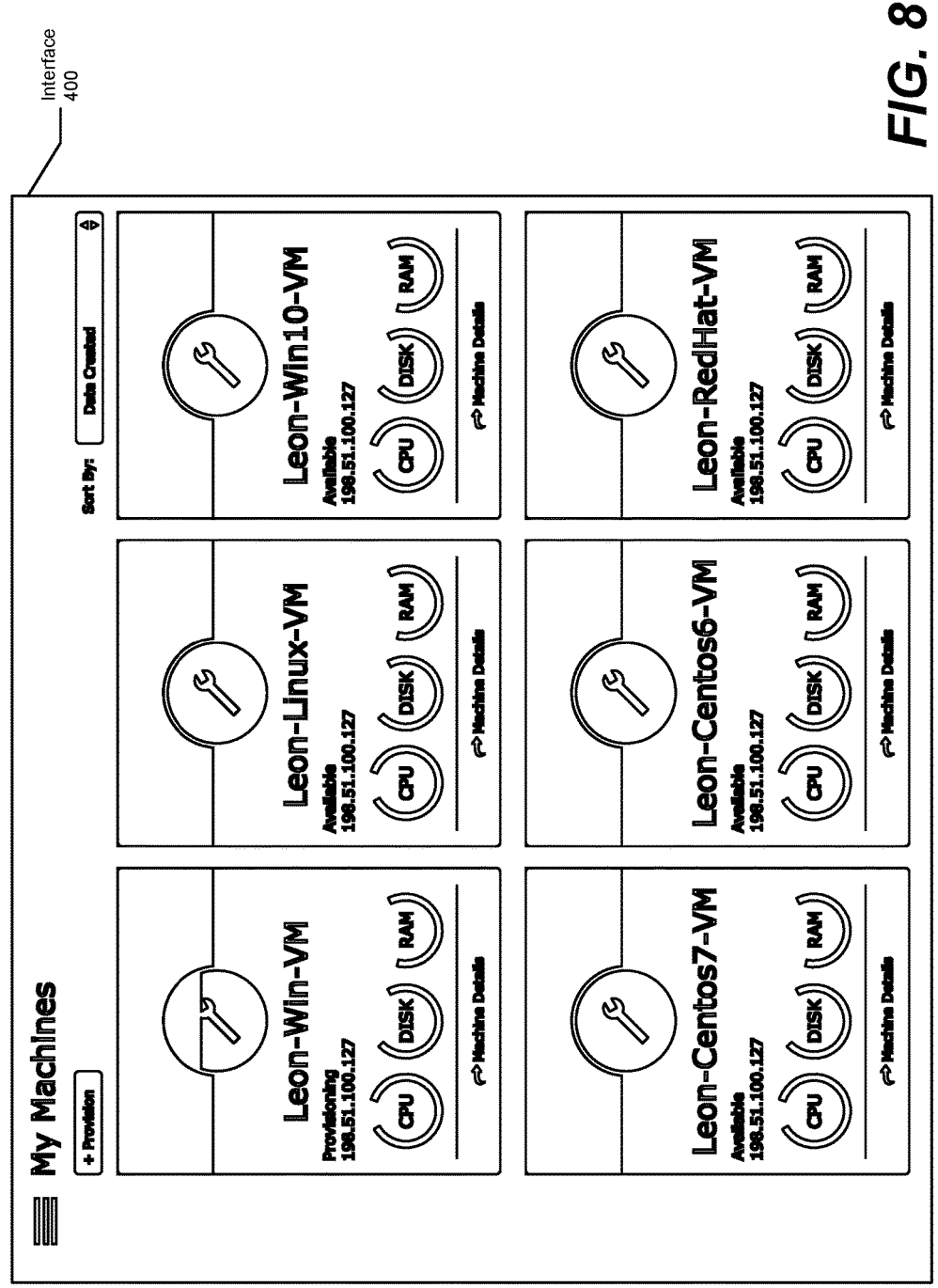
FIG. 8 is an illustration an exemplary card-based interface for enumerable datasets.
Figure 9:
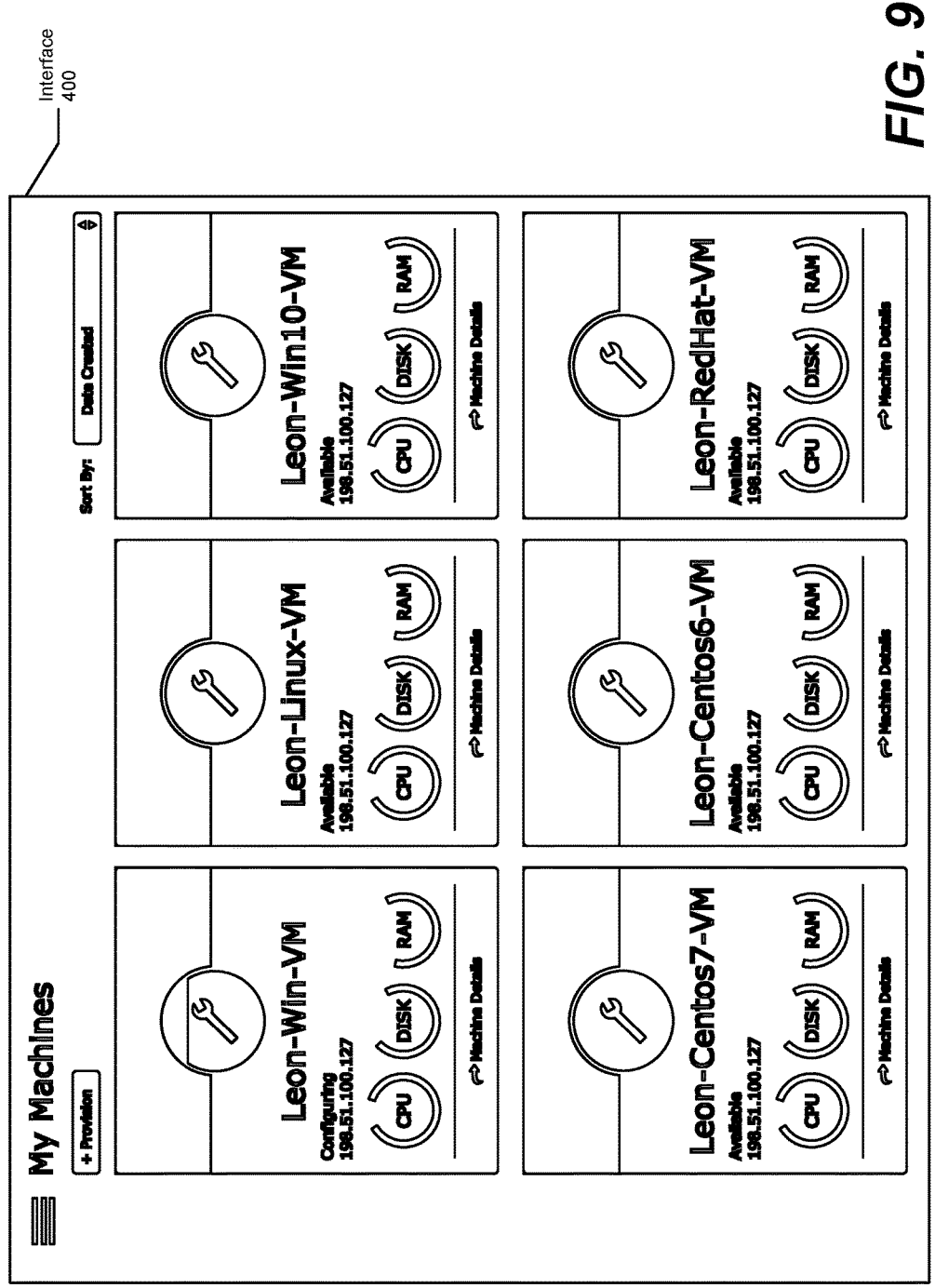
FIG. 9 is an illustration an exemplary card-based interface for enumerable datasets.
Figure 10:
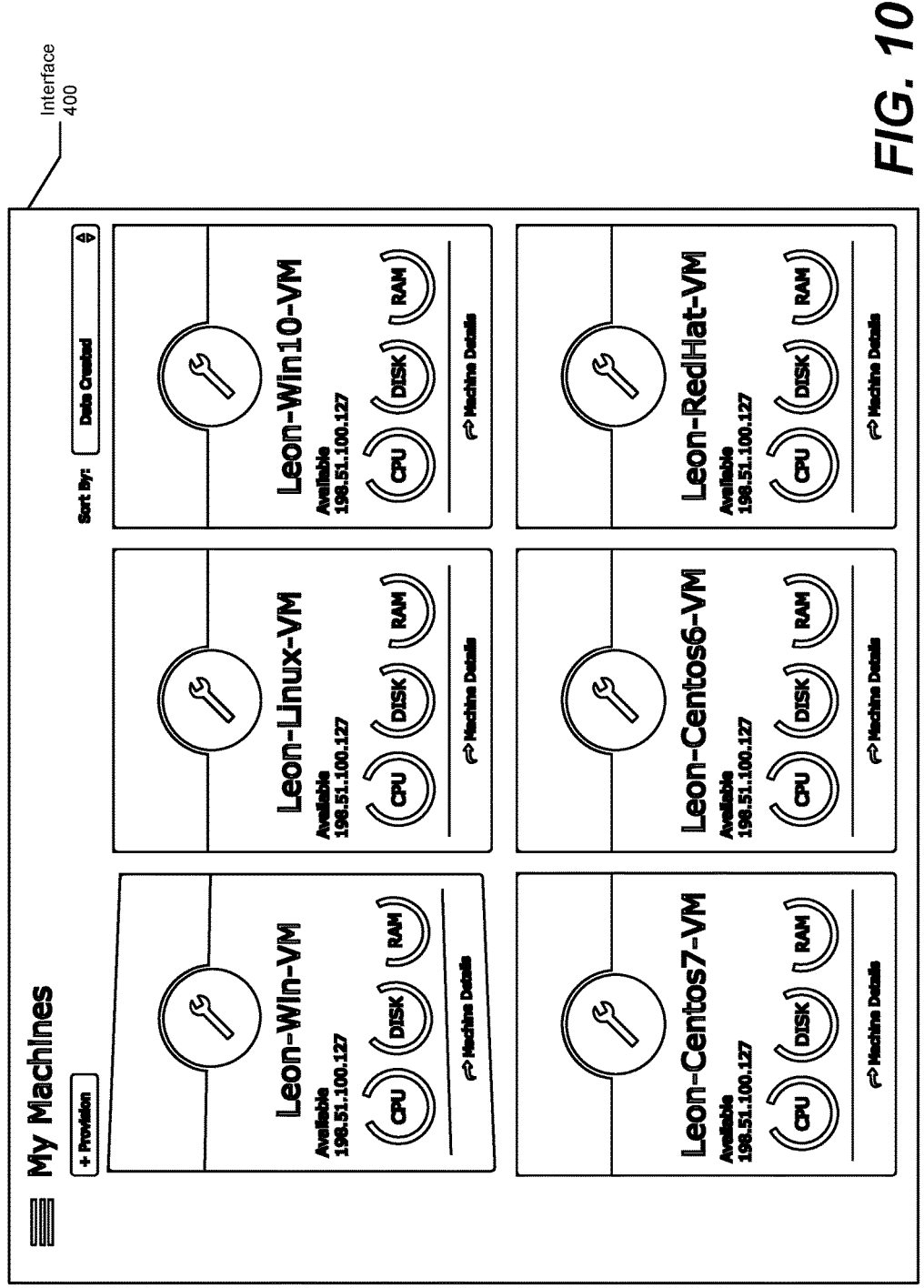
FIG. 10 is an illustration an exemplary card-based interface for enumerable datasets.
Figure 11:
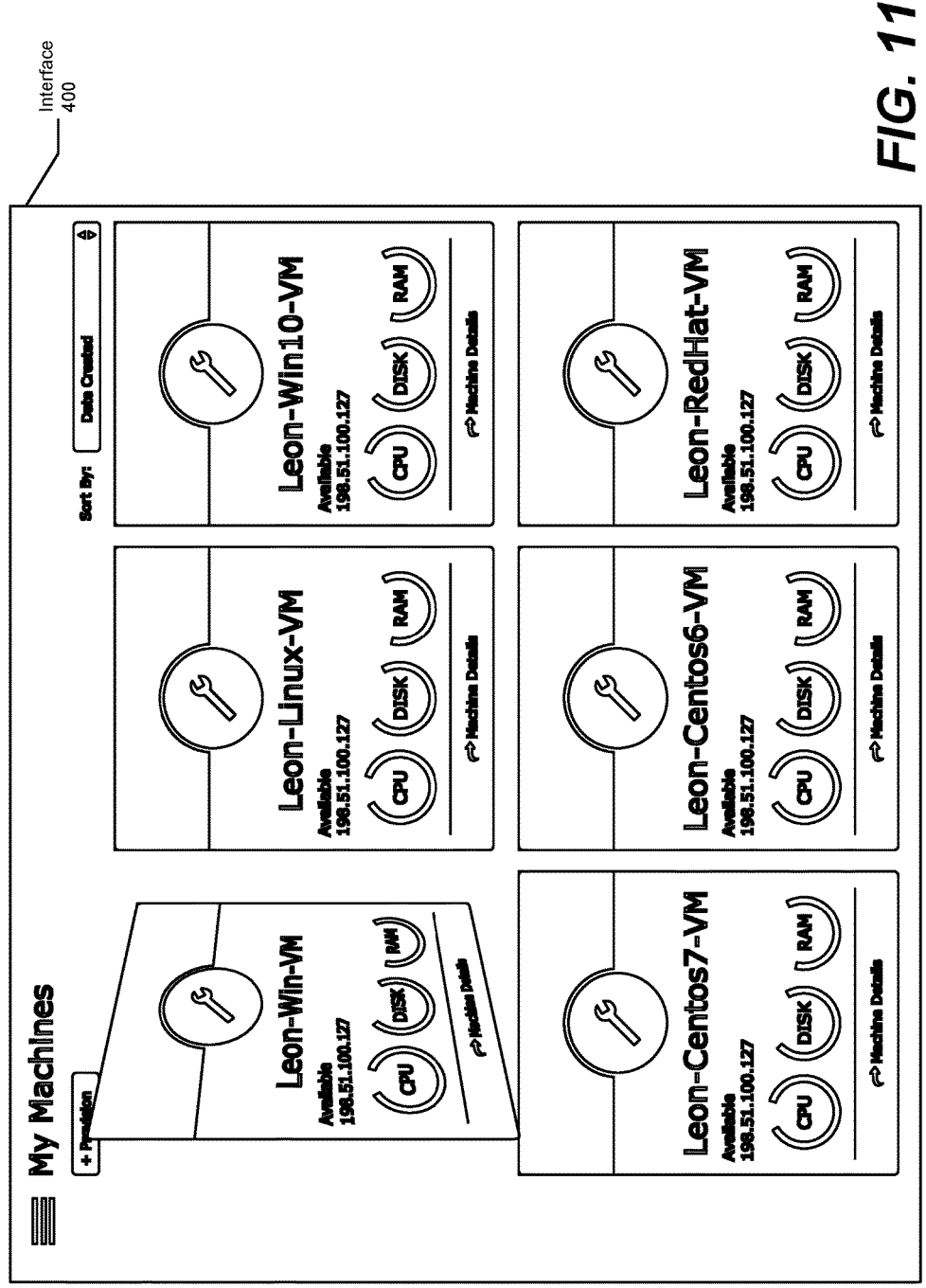
FIG. 11 is an illustration an exemplary card-based interface for enumerable datasets.
Figure 12:
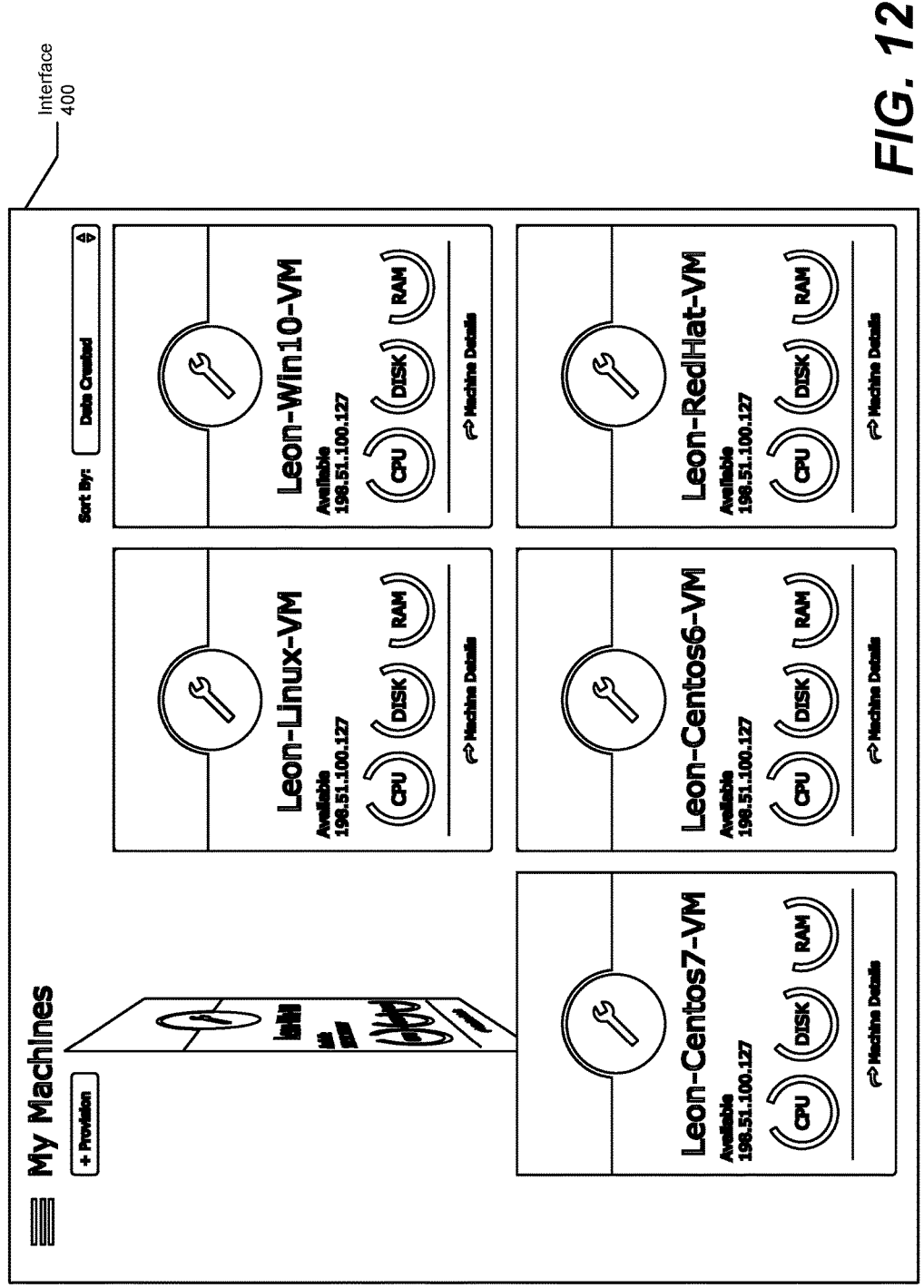
FIG. 12 is an illustration an exemplary card-based interface for enumerable datasets.
Figure 13:
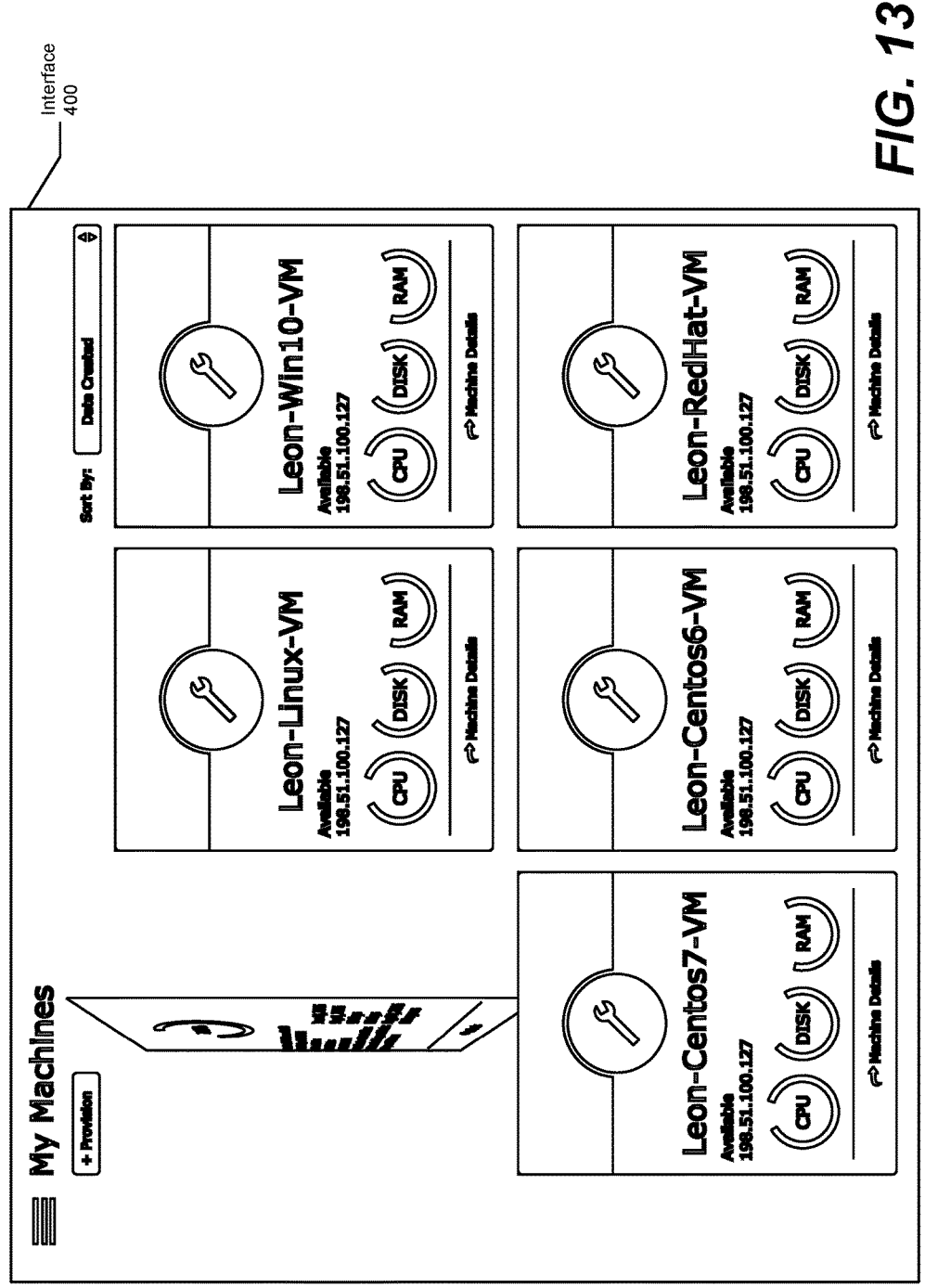
FIG. 13 is an illustration an exemplary card-based interface for enumerable datasets.
Figure 14:
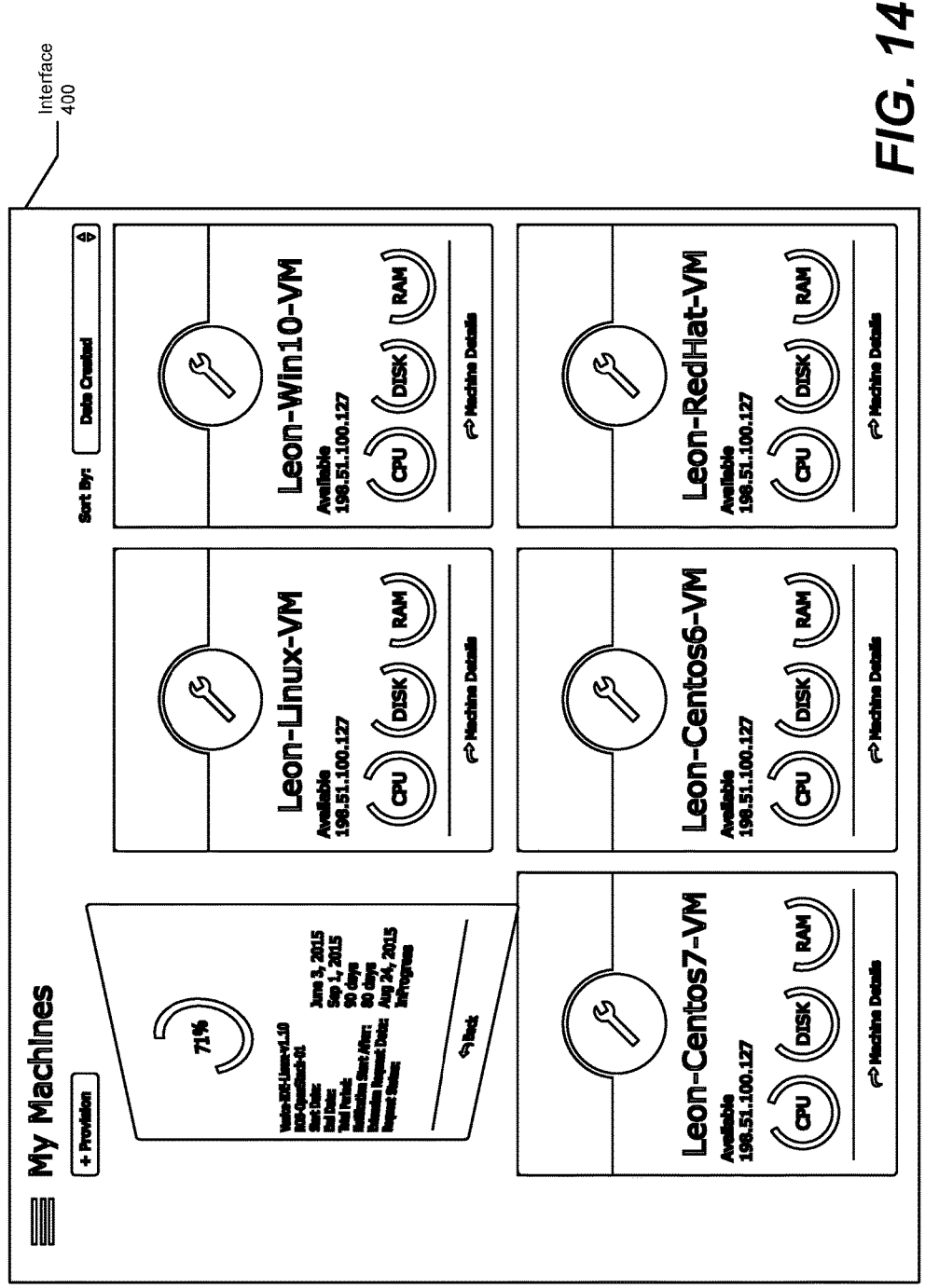
FIG. 14 is an illustration an exemplary card-based interface for enumerable datasets.
Figure 15:
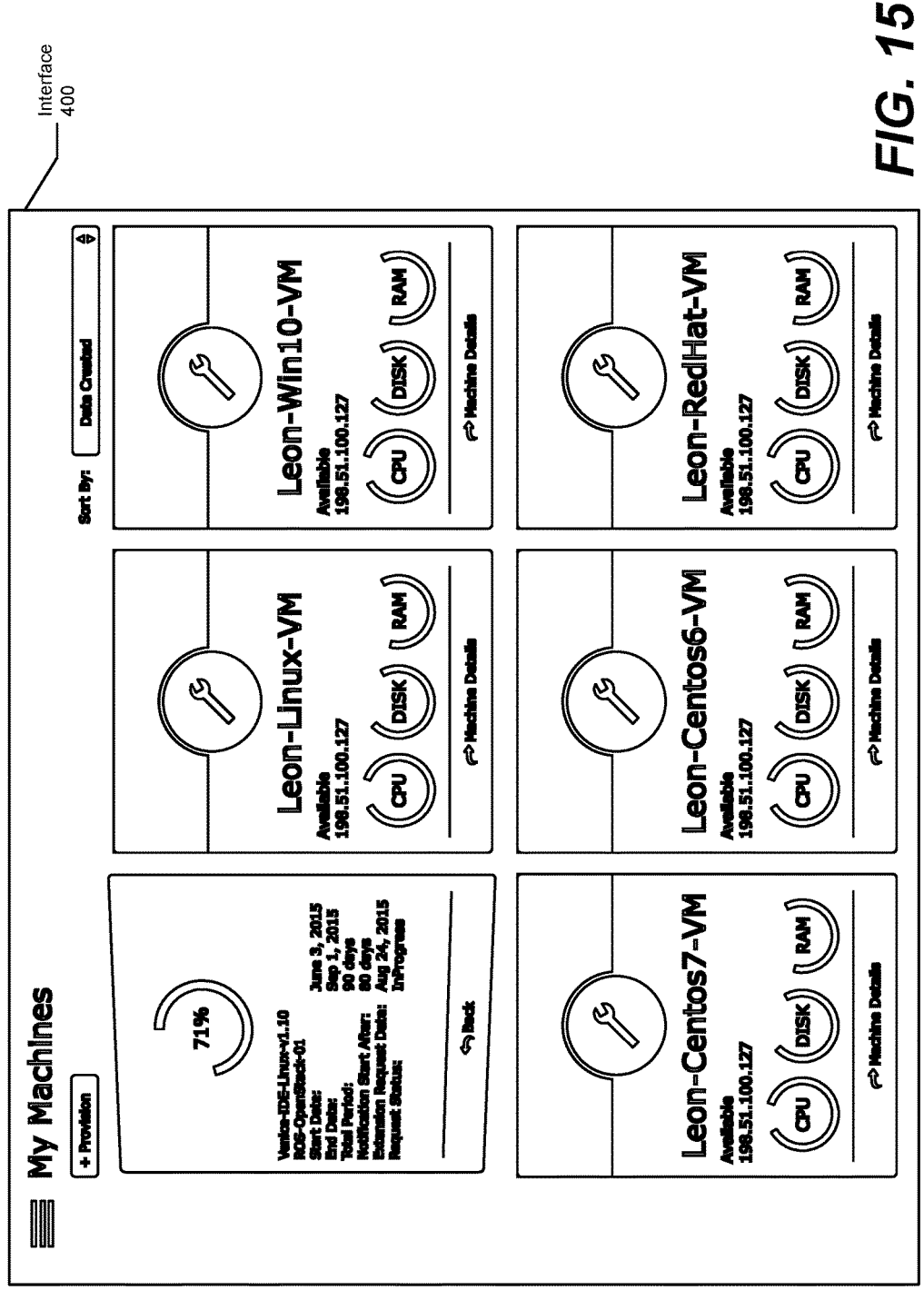
FIG. 15 is an illustration an exemplary card-based interface for enumerable datasets.
Figure 16:
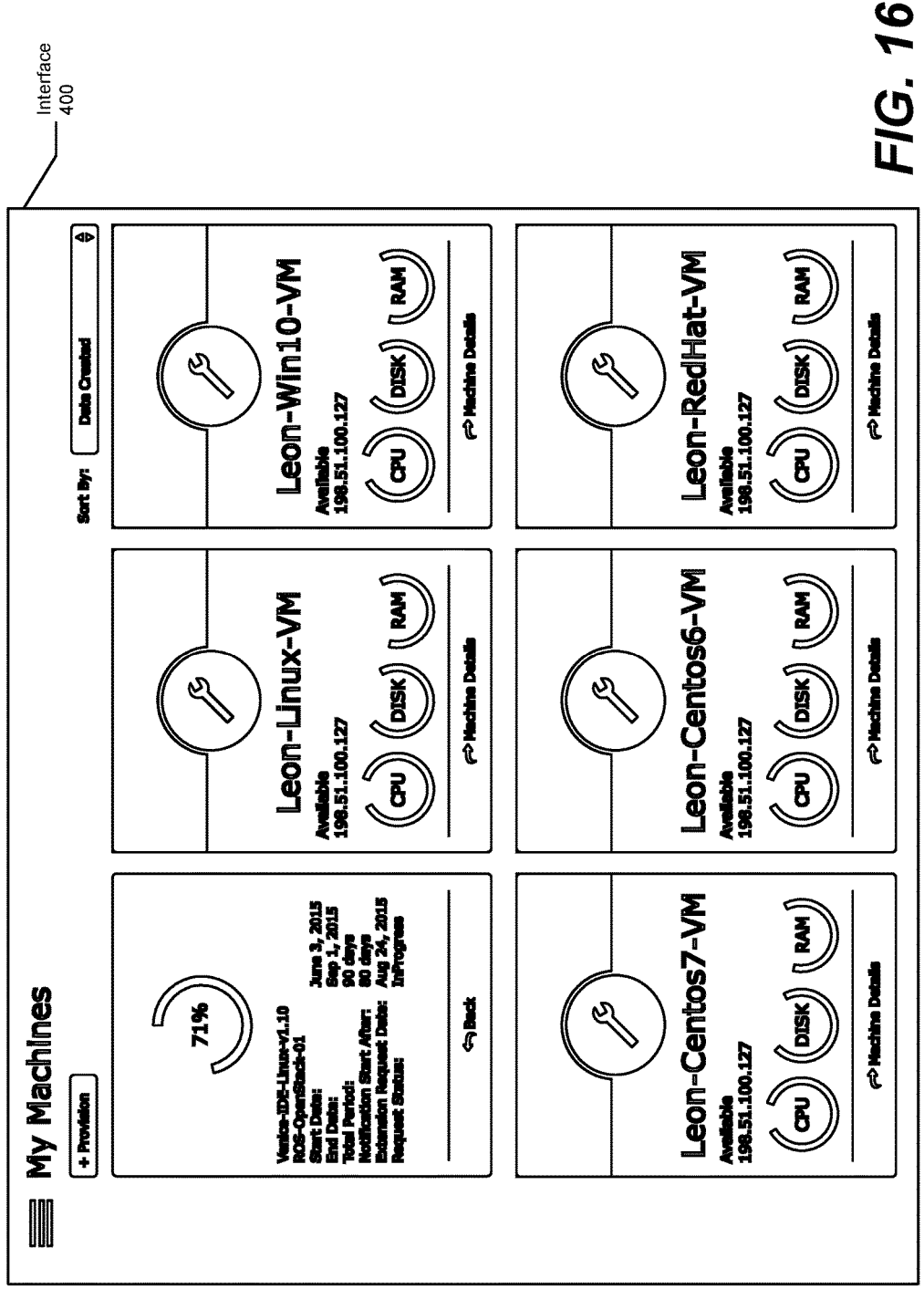
FIG. 16 is an illustration an exemplary card-based interface for enumerable datasets.
Figure 17:
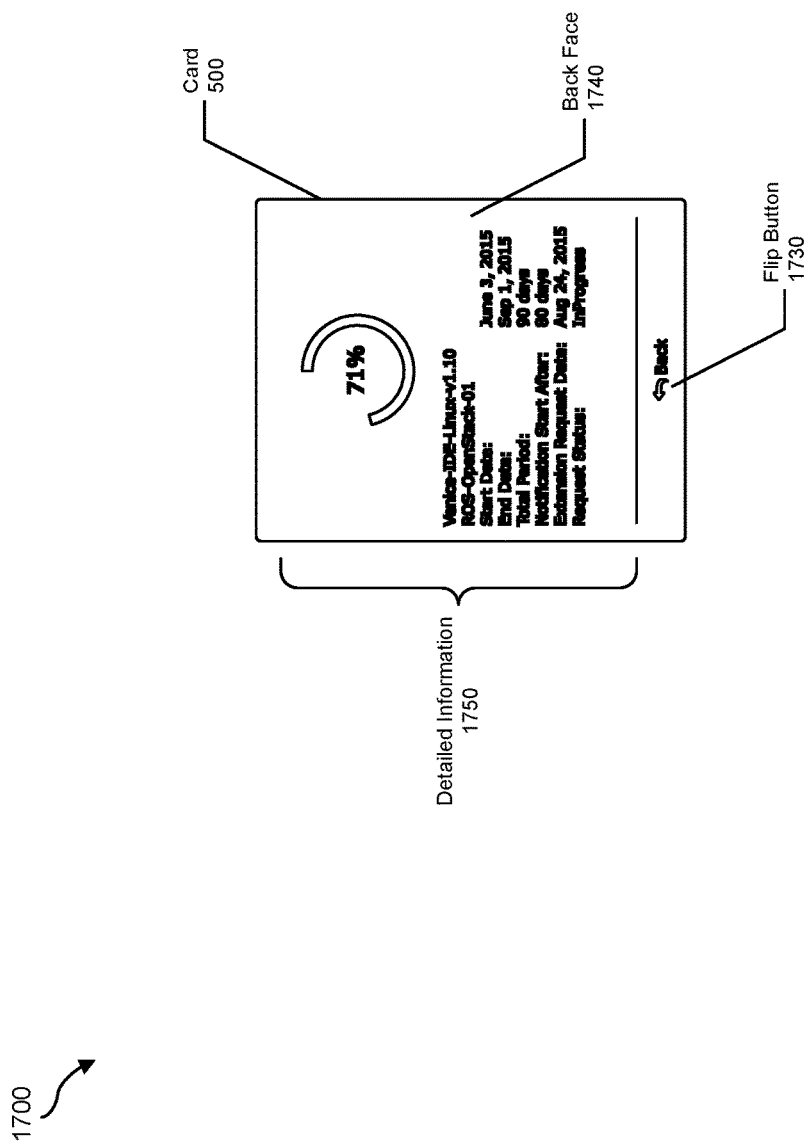
FIG. 17 is an illustration an exemplary card-based interface for enumerable datasets.

FIG. 17 shows an exemplary view 1700 illustrating exemplary card 500 showing a back face 1740. As shown in FIG. 17, back face 1740 may include a flip button 1730 (e.g., to reverse card 500 back to showing front face 540 as depicted in FIG. 5). In addition, back face 1740 may include detailed information 1750.

Figure 18:
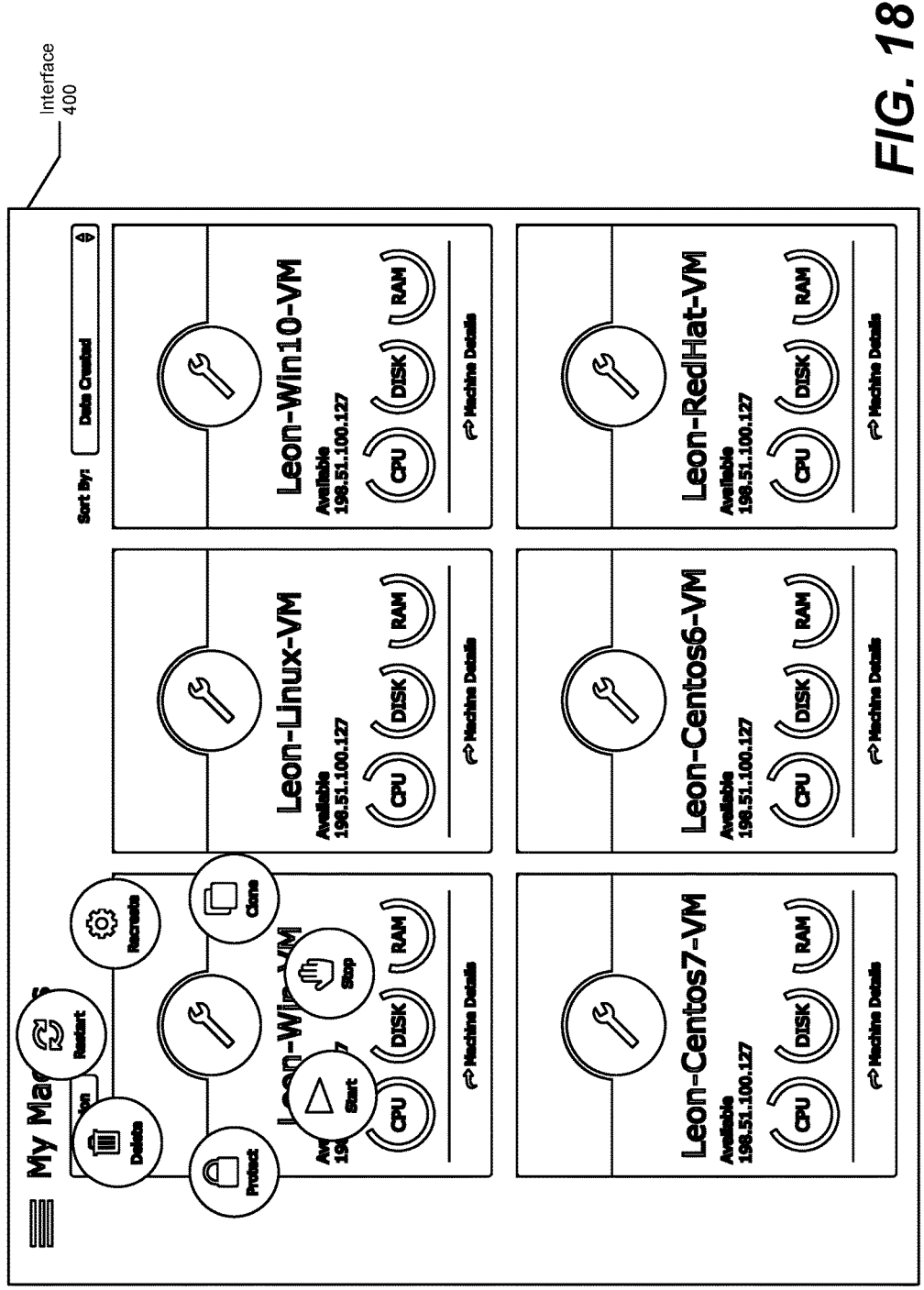
FIG. 18 is an illustration an exemplary card-based interface for enumerable datasets.
Figure 19:
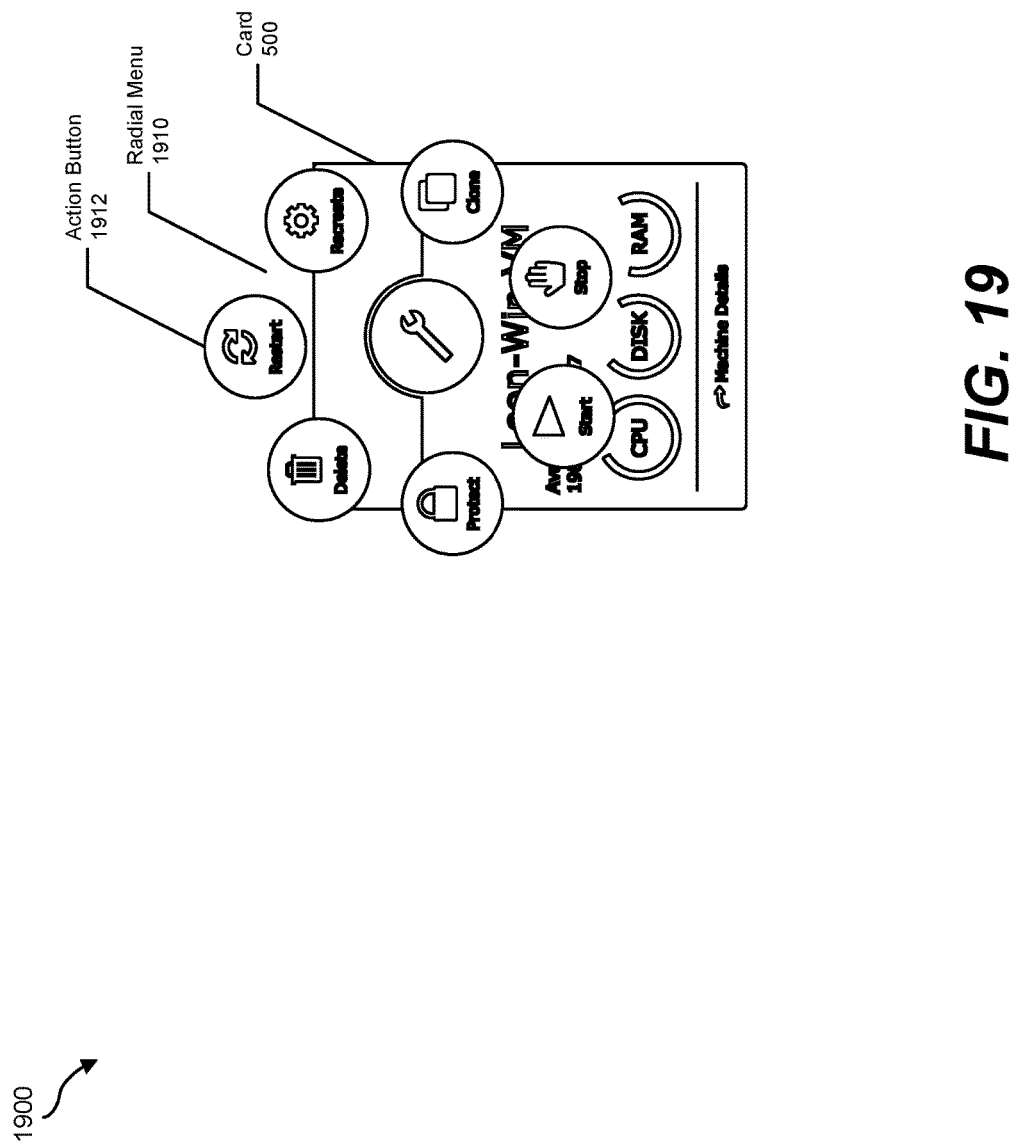
FIG. 19 is an illustration an exemplary card-based interface for enumerable datasets.

FIG. 18 shows exemplary interface 400 with a radial menu activated. FIG. 19 shows an exemplary view 1900 illustrating exemplary card 500 showing a radial menu 1910. In one example, radial menu 1910 may have been invoked by a user touching button 520 (as depicted in FIG. 5). In some examples, radial menu 1910 may appear after being invoked via an animation (e.g., the action buttons fading in from transparent images to solid images while transitioning from button 520 outward to their final positions in a circle). Radial menu 1910 may include various action buttons (seven being depicted in FIG. 19), including an action button 1912. Each action button may represent an action that may be performed on the computing resource represented by button 520. For example, radial menu 1910 may include action buttons to restart the virtual machine of card 500, to recreate the virtual machine of card 500, to stop the virtual machine of card 500, to start the virtual machine of card 500, to protect the virtual machine of card 500, and/or to delete the virtual machine of card 500. In some examples, action buttons irrelevant to the current state of the underlying computing resource may be greyed out or omitted from the radial menu. For example, when the virtual machine is running, the start action button may be greyed out or omitted, and when the virtual machine is stopped, the stop action button may be greyed out or omitted.

In one example, interface module 106 may (1) receive, via the radial menu, a selection of an action to perform on the computing resource, (2) initiate the action on the computing resource in response to receiving the selection of the action via the radial menu, and (3) display, via the button interface element, an animation indicating a progress toward completion of the action on the computing resource. For example, the button of the card may present an animation of the button filling (e.g., from the button up). In some examples, the speed of the animation may be based on time estimates based on historical data (e.g., so that the animation completes at the time that the operation defined by the action is estimated to complete). Additionally or alternatively, the button may fill to predetermined levels as predetermined checkpoints in the progress of the action are met. In some examples, the icon of the button may be replaced by an icon representing the action (e.g., an icon depicted on an action button of the action on the radial menu) while the action is in progress. Additionally or alternatively, the button may display an animation of the action icon filling to denote progress toward the completion of the action.

As explained above in connection with method 300 in FIG. 3, a mobile-device-oriented approach a data structure such as a table row as a card to provide strong visual feedback and context specific controls to generate a simple and consistent user interface. For each item within an enumeration, a card may be presented to a user. The card may include information about the primary purpose of the card (e.g., a card that represents an ORACLE database may include information indicating such). Additionally, all controls for the card may be contained within the card. When a computing resource (such as a database) represented by a card is in the process of being provisioned, and not yet available to the user, a central, circular button on the card may be disabled. Progress may be shown to the user by a color filling the button from the button. The timing of the fill may be determined by historical estimates for the given process to complete. Once the progress has completed, the button may change to an active state.

Actions associated with an item associated with a card may be presented by clicking on a large circular button located in the top center of the card. Upon clicking, buttons may fly out from the large circular button (e.g., as the remainder of the interface dims). Once the user clicks on one of the buttons, the interface may revert to its previous state and progress may be shown to the user via a fill animation of the central button.

Figure 20:
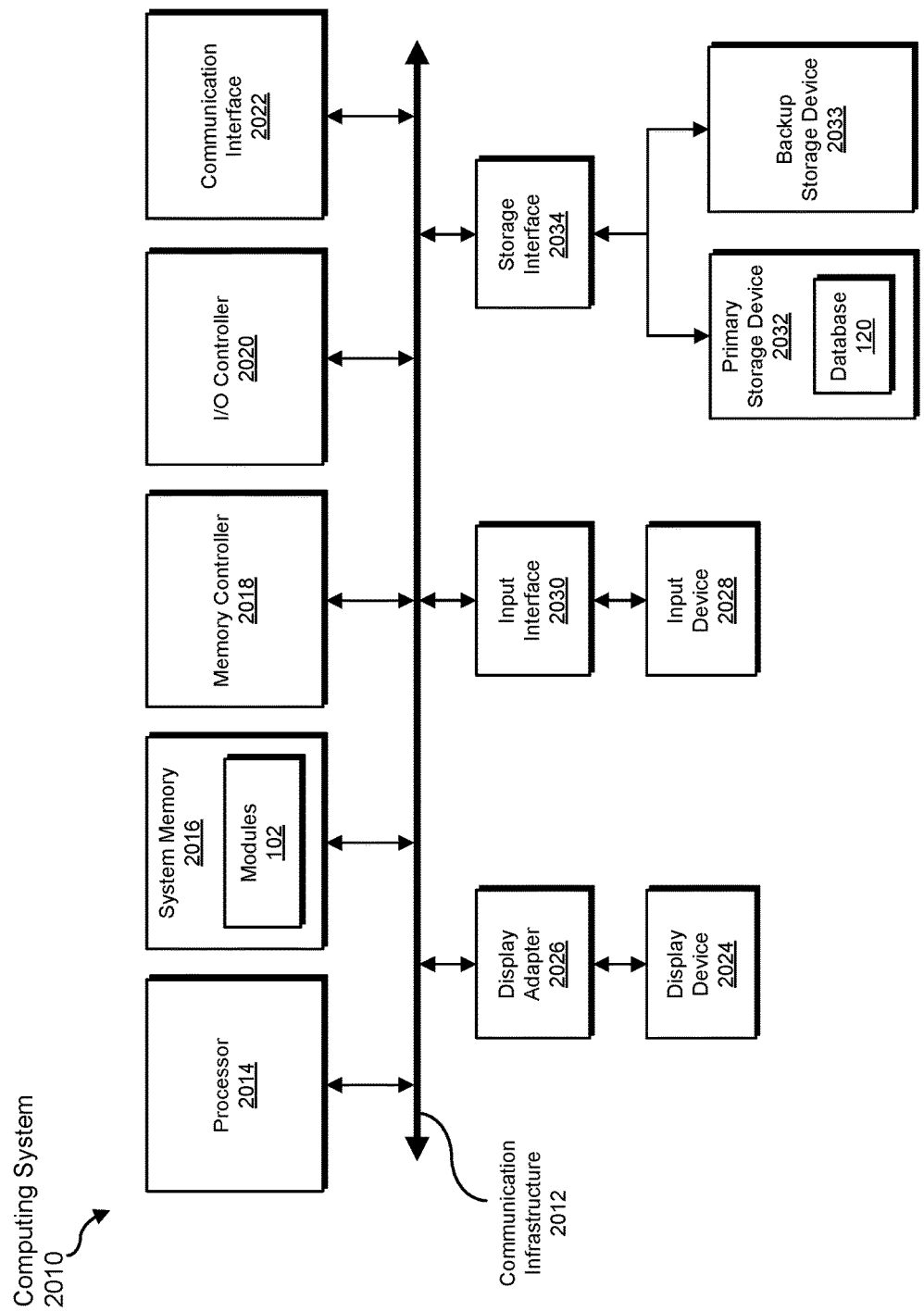
FIG. 20 is a block diagram of an exemplary computing system capable of implementing one or more of the embodiments described and/or illustrated herein.

FIG. 20 is a block diagram of an exemplary computing system 2010 capable of implementing one or more of the embodiments described and/or illustrated herein. For example, all or a portion of computing system 2010 may perform and/or be a means for performing, either alone or in combination with other elements, one or more of the steps described herein (such as one or more of the steps illustrated in FIG. 3). All or a portion of computing system 2010 may also perform and/or be a means for performing any other steps, methods, or processes described and/or illustrated herein.

Computing system 2010 broadly represents any single or multi-processor computing device or system capable of executing computer-readable instructions. Examples of computing system 2010 include, without limitation, workstations, laptops, client-side terminals, servers, distributed computing systems, handheld devices, or any other computing system or device. In its most basic configuration, computing system 2010 may include at least one processor 2014 and a system memory 2016.

Processor 2014 generally represents any type or form of physical processing unit (e.g., a hardware-implemented central processing unit) capable of processing data or interpreting and executing instructions. In certain embodiments, processor 2014 may receive instructions from a software application or module. These instructions may cause processor 2014 to perform the functions of one or more of the exemplary embodiments described and/or illustrated herein.

System memory 2016 generally represents any type or form of volatile or non-volatile storage device or medium capable of storing data and/or other computer-readable instructions. Examples of system memory 2016 include, without limitation, Random Access Memory (RAM), Read Only Memory (ROM), flash memory, or any other suitable memory device. Although not required, in certain embodiments computing system 2010 may include both a volatile memory unit (such as, for example, system memory 2016) and a non-volatile storage device (such as, for example, primary storage device 2032, as described in detail below). In one example, one or more of modules 102 from FIG. 1 may be loaded into system memory 2016.

In certain embodiments, exemplary computing system 2010 may also include one or more components or elements in addition to processor 2014 and system memory 2016. For example, as illustrated in FIG. 20, computing system 2010 may include a memory controller 2018, an Input/Output (I/O) controller 2020, and a communication interface 2022, each of which may be interconnected via a communication infrastructure 2012. Communication infrastructure 2012 generally represents any type or form of infrastructure capable of facilitating communication between one or more components of a computing device. Examples of communication infrastructure 2012 include, without limitation, a communication bus (such as an Industry Standard Architecture (ISA), Peripheral Component Interconnect (PCI), PCI Express (PCIe), or similar bus) and a network.

Memory controller 2018 generally represents any type or form of device capable of handling memory or data or controlling communication between one or more components of computing system 2010. For example, in certain embodiments memory controller 2018 may control communication between processor 2014, system memory 2016, and I/O controller 2020 via communication infrastructure 2012.

I/O controller 2020 generally represents any type or form of module capable of coordinating and/or controlling the input and output functions of a computing device. For example, in certain embodiments I/O controller 2020 may control or facilitate transfer of data between one or more elements of computing system 2010, such as processor 2014, system memory 2016, communication interface 2022, display adapter 2026, input interface 2030, and storage interface 2034.

Communication interface 2022 broadly represents any type or form of communication device or adapter capable of facilitating communication between exemplary computing system 2010 and one or more additional devices. For example, in certain embodiments communication interface 2022 may facilitate communication between computing system 2010 and a private or public network including additional computing systems. Examples of communication interface 2022 include, without limitation, a wired network interface (such as a network interface card), a wireless network interface (such as a wireless network interface card), a modem, and any other suitable interface. In at least one embodiment, communication interface 2022 may provide a direct connection to a remote server via a direct link to a network, such as the Internet. Communication interface 2022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 2022 may also represent a host adapter configured to facilitate communication between computing system 2010 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 2022 may also allow computing system 2010 to engage in distributed or remote computing. For example, communication interface 2022 may receive instructions from a remote device or send instructions to a remote device for execution.

As illustrated in FIG. 20, computing system 2010 may also include at least one display device 2024 coupled to communication infrastructure 2012 via a display adapter 2026. Display device 2024 generally represents any type or form of device capable of visually displaying information forwarded by display adapter 2026. Similarly, display adapter 2026 generally represents any type or form of device configured to forward graphics, text, and other data from communication infrastructure 2012 (or from a frame buffer, as known in the art) for display on display device 2024.

As illustrated in FIG. 20, exemplary computing system 2010 may also include at least one input device 2028 coupled to communication infrastructure 2012 via an input interface 2030. Input device 2028 generally represents any type or form of input device capable of providing input, either computer or human generated, to exemplary computing system 2010. Examples of input device 2028 include, without limitation, a keyboard, a pointing device, a speech recognition device, or any other input device.

As illustrated in FIG. 20, exemplary computing system 2010 may also include a primary storage device 2032 and a backup storage device 2033 coupled to communication infrastructure 2012 via a storage interface 2034. Storage devices 2032 and 2033 generally represent any type or form of storage device or medium capable of storing data and/or other computer-readable instructions. For example, storage devices 2032 and 2033 may be a magnetic disk drive (e.g., a so-called hard drive), a solid state drive, a floppy disk drive, a magnetic tape drive, an optical disk drive, a flash drive, or the like. Storage interface 2034 generally represents any type or form of interface or device for transferring data between storage devices 2032 and 2033 and other components of computing system 2010. In one example, database 120 from FIG. 1 may be stored in primary storage device 2032.

In certain embodiments, storage devices 2032 and 2033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 2032 and 2033 may also include other similar structures or devices for allowing computer software, data, or other computer-readable instructions to be loaded into computing system 2010. For example, storage devices 2032 and 2033 may be configured to read and write software, data, or other computer-readable information. Storage devices 2032 and 2033 may also be a part of computing system 2010 or may be a separate device accessed through other interface systems.

Many other devices or subsystems may be connected to computing system 2010. Conversely, all of the components and devices illustrated in FIG. 20 need not be present to practice the embodiments described and/or illustrated herein. The devices and subsystems referenced above may also be interconnected in different ways from that shown in FIG. 20. Computing system 2010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 2010. All or a portion of the computer program stored on the computer-readable medium may then be stored in system memory 2016 and/or various portions of storage devices 2032 and 2033. When executed by processor 2014, a computer program loaded into computing system 2010 may cause processor 2014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 2010 may be configured as an Application Specific Integrated Circuit (ASIC) adapted to implement one or more of the exemplary embodiments disclosed herein.

Figure 21:
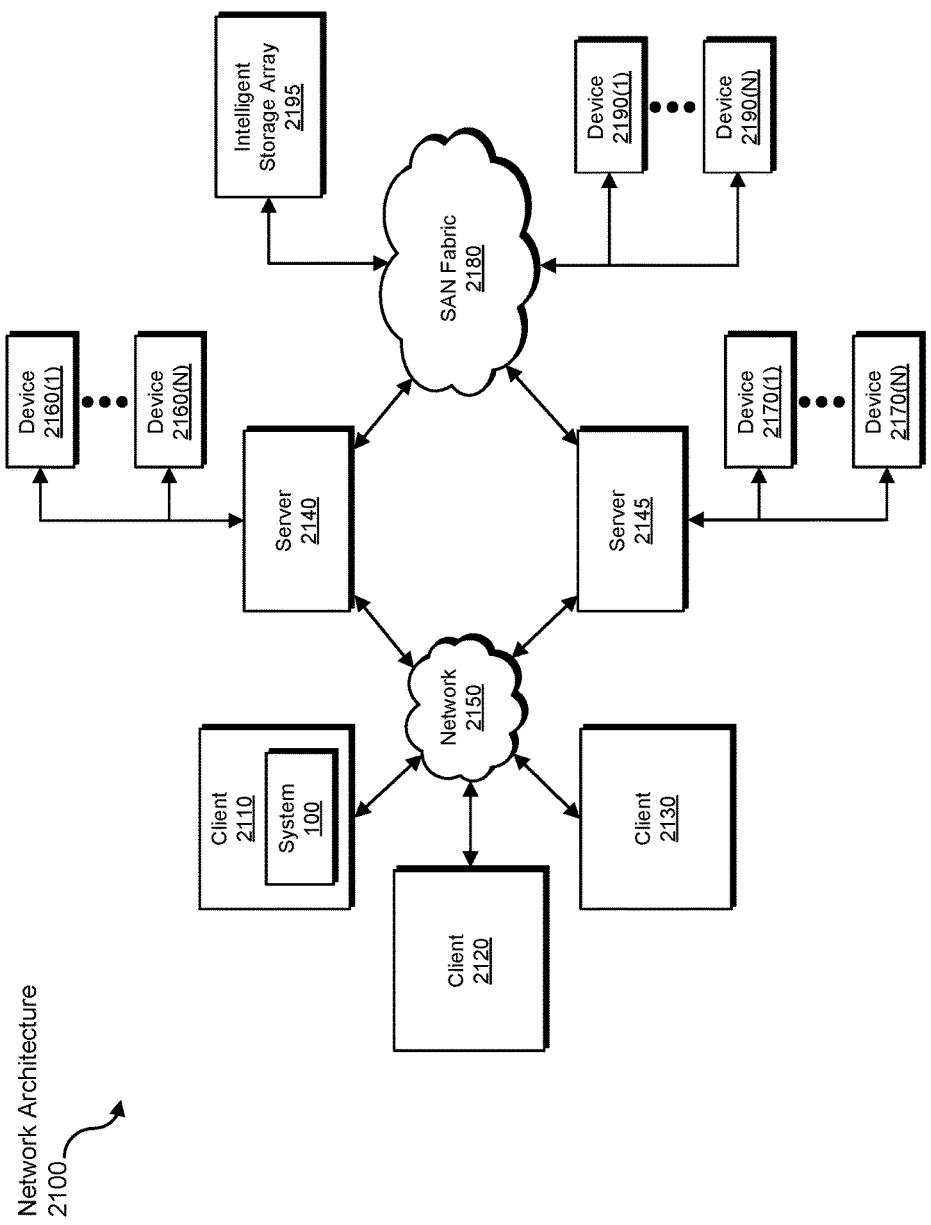
FIG. 21 is a block diagram of an exemplary computing network capable of implementing one or more of the embodiments described and/or illustrated herein.

FIG. 21 is a block diagram of an exemplary network architecture 2100 in which client systems 2110, 2120, and 2130 and servers 2140 and 2145 may be coupled to a network 2150. As detailed above, all or a portion of network architecture 2100 may perform and/or be a means for performing, either alone or in combination with other elements, one or more of the steps disclosed herein (such as one or more of the steps illustrated in FIG. 3). All or a portion of network architecture 2100 may also be used to perform and/or be a means for performing other steps and features set forth in the instant disclosure.

Client systems 2110, 2120, and 2130 generally represent any type or form of computing device or system, such as exemplary computing system 2010 in FIG. 20. Similarly, servers 2140 and 2145 generally represent computing devices or systems, such as application servers or database servers, configured to provide various database services and/or run certain software applications. Network 2150 generally represents any telecommunication or computer network including, for example, an intranet, a WAN, a LAN, a PAN, or the Internet. In one example, client systems 2110, 2120, and/or 2130 and/or servers 2140 and/or 2145 may include all or a portion of system 100 from FIG. 1.

As illustrated in FIG. 21, one or more storage devices 2160(1)-(N) may be directly attached to server 2140. Similarly, one or more storage devices 2170(1)-(N) may be directly attached to server 2145. Storage devices 2160(1)-(N) and storage devices 2170(1)-(N) generally represent any type or form of storage device or medium capable of storing data and/or other computer-readable instructions. In certain embodiments, storage devices 2160(1)-(N) and storage devices 2170(1)-(N) may represent Network-Attached Storage (NAS) devices configured to communicate with servers 2140 and 2145 using various protocols, such as Network File System (NFS), Server Message Block (SMB), or Common Internet File System (CIFS).

Servers 2140 and 2145 may also be connected to a Storage Area Network (SAN) fabric 2180. SAN fabric 2180 generally represents any type or form of computer network or architecture capable of facilitating communication between a plurality of storage devices. SAN fabric 2180 may facilitate communication between servers 2140 and 2145 and a plurality of storage devices 2190(1)-(N) and/or an intelligent storage array 2195. SAN fabric 2180 may also facilitate, via network 2150 and servers 2140 and 2145, communication between client systems 2110, 2120, and 2130 and storage devices 2190(1)-(N) and/or intelligent storage array 2195 in such a manner that devices 2190(1)-(N) and array 2195 appear as locally attached devices to client systems 2110, 2120, and 2130. As with storage devices 2160(1)-(N) and storage devices 2170(1)-(N), storage devices 2190(1)-(N) and intelligent storage array 2195 generally represent any type or form of storage device or medium capable of storing data and/or other computer-readable instructions.

In certain embodiments, and with reference to exemplary computing system 2010 of FIG. 20, a communication interface, such as communication interface 2022 in FIG. 20, may be used to provide connectivity between each client system 2110, 2120, and 2130 and network 2150. Client systems 2110, 2120, and 2130 may be able to access information on server 2140 or 2145 using, for example, a web browser or other client software. Such software may allow client systems 2110, 2120, and 2130 to access data hosted by server 2140, server 2145, storage devices 2160(1)-(N), storage devices 2170(1)-(N), storage devices 2190(1)-(N), or intelligent storage array 2195. Although FIG. 21 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 2140, server 2145, storage devices 2160(1)-(N), storage devices 2170(1)-(N), storage devices 2190(1)-(N), intelligent storage array 2195, or any combination thereof. All or a portion of one or more of the exemplary embodiments disclosed herein may also be encoded as a computer program, stored in server 2140, run by server 2145, and distributed to client systems 2110, 2120, and 2130 over network 2150.

As detailed above, computing system 2010 and/or one or more components of network architecture 2100 may perform and/or be a means for performing, either alone or in combination with other elements, one or more steps of an exemplary method for providing card-based interfaces for enumerable datasets.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an enumerable dataset to be transformed, transform the enumerable dataset, output a result of the transformation to a display device, use the result of the transformation to relay information to and from a user via an interface, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing card-based interfaces for enumerable datasets, at least a portion of the method being performed by a computing device comprising at least one processor, the method comprising:
 identifying a plurality of computing resources within a computing environment subject to a unified administration, wherein each computing resource has assigned to it a respective memory and processor;
 identifying a request to display the computing resources within a graphical user interface;
 in response to the request, portraying each computing resource within the plurality of computing resources within the graphical user interface as a card that comprises:
  a button interface element on a front face of the card that, when invoked, presents a radial menu of actions to perform on the computing resource;
  a summary description of the computing resource on the front face of the card;
  a flipping interface element that, when invoked, flips the card between the front face of the card and a back face of the card;
  a detailed description of the computing resource on the back face of the card.

2. The computer-implemented method of claim 1, wherein the graphical user interface further comprises a provisioning interface element that, when invoked, adds a new computing resource to the computing environment and adds a new card portraying the new computing resource to the graphical user interface.

3. The computer-implemented method of claim 2, wherein:
 the new card portraying the new computing resource is added to the graphical user interface before the new computing resource is fully provisioned in the computing environment;

the button interface element displays a filling animation while the new computing resource is being provisioned in the computing environment.

4. The computer-implemented method of claim 1, further comprising:
receiving, via the radial menu, a selection of an action to perform on the computing resource;
initiating the action on the computing resource in response to receiving the selection of the action via the radial menu;
displaying, via the button interface element, an animation indicating a progress toward completion of the action on the computing resource.

5. The computer-implemented method of claim 1, wherein portraying each computing resource within the plurality computing resources within the graphical user interface as a card is in response to determining that the graphical user interface comprises an interface for at least one of:
a mobile device;
a touchscreen device.

6. The computer-implemented method of claim 1, wherein portraying each computing resource within the plurality of computing resources within the graphical user interface as a card comprises portraying the plurality of computing resources as a plurality of grid-aligned cards.

7. The computer-implemented method of claim 1, wherein:
the plurality of computing resources comprises a plurality of virtual machines;
portraying each computing resource within the plurality of computing resources within the graphical user interface as a card comprises portraying each virtual machine within the plurality of virtual machines within the graphical user interface as a card.

8. The computer-implemented method of claim 1, wherein:
the plurality of computing resources share a same computing resource type;
the summary description and the detailed description together comprise a plurality of fields common to the computing resource type;
a layout of the plurality of fields on the card is uniform and based on the computing resource type.

9. The computer-implemented method of claim 1, wherein the detailed description of the computing resource portrays a larger number of data fields than the summary description of the computing resource portrays.

10. The computer-implemented method of claim 1, wherein the detailed description of the computing resource portrays more textual information than the summary description of the computing resource portrays.

11. The computer-implemented method of claim 1, wherein the detailed description of the computing resource portrays at least one detailed data field that specifically describes an aspect of the computing resource that is generally described by at least one summary data field.

12. A system for providing card-based interfaces for enumerable datasets, the system comprising:
an identification module, stored in memory, that:
identifies a plurality of computing resources within a computing environment subject to a unified administration, wherein each computing resource has assigned to it a respective memory and processor;
identifies a request to display the computing resources within a graphical user interface;
an interface module, stored in memory, that, in response to the request, portrays each computing resource within the plurality of computing resources within the graphical user interface as a card that comprises:
a button interface element on a front face of the card that, when invoked, presents a radial menu of actions to perform on the computing resource;
a summary description of the computing resource on the front face of the card;
a flipping interface element that, when invoked, flips the card between the front face of the card and a back face of the card;
a detailed description of the computing resource on the back face of the card;
at least one physical processor configured to execute the identification module and the interface module.

13. The system of claim 12, wherein the graphical user interface further comprises a provisioning interface element that, when invoked, adds a new computing resource to the computing environment and adds a new card portraying the new computing resource to the graphical user interface.

14. The system of claim 13, wherein:
the new card portraying the new computing resource is added to the graphical user interface before the new computing resource is fully provisioned in the computing environment;
the button interface element displays a filling animation while the new computing resource is being provisioned in the computing environment.

15. The system of claim 12, wherein the interface module further:
receives, via the radial menu, a selection of an action to perform on the computing resource;
initiates the action on the computing resource in response to receiving the selection of the action via the radial menu;
displays, via the button interface element, an animation indicating a progress toward completion of the action on the computing resource.

16. The system of claim 12, wherein the interface module portrays each computing resource within the plurality computing resources within the graphical user interface as a card is in response to determining that the graphical user interface comprises an interface for at least one of:
a mobile device;
a touchscreen device.

17. The system of claim 12, wherein the interface module portrays each computing resource within the plurality of computing resources within the graphical user interface as a card by portraying the plurality of computing resources as a plurality of grid-aligned cards.

18. The system of claim 12, wherein:
the plurality of computing resources comprises a plurality of virtual machines;
the interface module portrays each computing resource within the plurality of computing resources within the graphical user interface as a card by portraying each virtual machine within the plurality of virtual machines within the graphical user interface as a card.

19. The system of claim 12, wherein:
the plurality of computing resources share a same computing resource type;
the summary description and the detailed description together comprise a plurality of fields common to the computing resource type;
a layout of the plurality of fields on the card is uniform and based on the computing resource type.

20. A non-transitory computer-readable medium comprising one or more computer-readable instructions that, when executed by at least one processor of a computing device, cause the computing device to:
- identify a plurality of computing resources within a computing environment subject to a unified administration, wherein each computing resource has assigned to it a respective memory and processor;
- identify a request to display the computing resources within a graphical user interface;
- in response to the request, portray each computing resource within the plurality of computing resources within the graphical user interface as a card that comprises:
    - a button interface element on a front face of the card that, when invoked, presents a radial menu of actions to perform on the computing resource;
    - a summary description of the computing resource on the front face of the card;
    - a flipping interface element that, when invoked, flips the card between the front face of the card and a back face of the card;
    - a detailed description of the computing resource on the back face of the card.

* * * * *

UNITED STATES PATENT AND TRADEMARK OFFICE
CERTIFICATE OF CORRECTION

PATENT NO. : 10,055,184 B1
APPLICATION NO. : 15/057011
DATED : August 21, 2018
INVENTOR(S) : Ferrell et al.

Page 1 of 1

It is certified that error appears in the above-identified patent and that said Letters Patent is hereby corrected as shown below:

On the Title Page

In Item (71), under "Applicant", Line 1, delete "Veritas US IP Holdings LLC," and insert -- Veritas Technologies LLC, --, therefor.

Signed and Sealed this
Twentieth Day of November, 2018

Andrei Iancu
*Director of the United States Patent and Trademark Office*